(12) United States Patent
Watanabe et al.

(10) Patent No.: US 10,395,386 B2
(45) Date of Patent: Aug. 27, 2019

(54) IMAGE PROCESSING APPARATUS AND X-RAY DIAGNOSIS APPARATUS

(71) Applicant: Toshiba Medical Systems Corporation, Otawara-shi (JP)

(72) Inventors: Yuichiro Watanabe, Yaita (JP); Takuya Sakaguchi, Utsunomiya (JP)

(73) Assignee: Canon Medical Systems Corporation, Otawara-shi (JP)

( * ) Notice: Subject to any disclaimer, the term of this patent is extended or adjusted under 35 U.S.C. 154(b) by 98 days.

(21) Appl. No.: 15/499,056

(22) Filed: Apr. 27, 2017

(65) Prior Publication Data

US 2017/0316579 A1 Nov. 2, 2017

(30) Foreign Application Priority Data

Apr. 28, 2016 (JP) .................................. 2016-091547

(51) Int. Cl.
*G06K 9/00* (2006.01)
*G06T 7/73* (2017.01)

(52) U.S. Cl.
CPC ...... *G06T 7/73* (2017.01); *G06T 2207/10116* (2013.01)

(58) Field of Classification Search
CPC . G06T 2207/10116; G06T 2207/30204; G06T 7/73; A61B 6/12; A61B 6/4441; A61B 6/504; A61B 5/055; A61B 5/7267; A61B 6/503; A61B 6/507

USPC .......................................................... 382/132
See application file for complete search history.

(56) References Cited

U.S. PATENT DOCUMENTS

| | | | |
|---|---|---|---|
| 9,082,158 B2 | 7/2015 | Chen et al. | |
| 9,801,602 B2 * | 10/2017 | Nagae ................. | A61B 6/5205 |
| 2010/0142792 A1 | 6/2010 | Sakaguchi et al. | |

FOREIGN PATENT DOCUMENTS

| | | |
|---|---|---|
| JP | 2007-330522 | 12/2007 |
| JP | 2010-131263 | 6/2010 |
| JP | 2010-131371 | 6/2010 |
| JP | 2012-16526 | 1/2012 |
| JP | 2015-128578 | 7/2015 |

* cited by examiner

*Primary Examiner* — Charlotte M Baker
(74) *Attorney, Agent, or Firm* — Oblon, McClelland, Maier & Neustadt, L.L.P.

(57) ABSTRACT

An image processing apparatus according to an embodiment includes processing circuitry. The processing circuitry detects the position of an object included in each of sequentially generated X-ray images. The processing circuitry generate corrected images by a correction process to substantially match, with a reference position, the detected position of the object in a X-ray image generated after a reference X-ray image, the reference position being the detected position in the reference X-ray image. The processing circuitry determines an addition condition of each region of a sequentially generated corrected image. The processing circuitry causes a display to display an added image to which a corrected image is added in accordance with the determined addition condition.

18 Claims, 12 Drawing Sheets

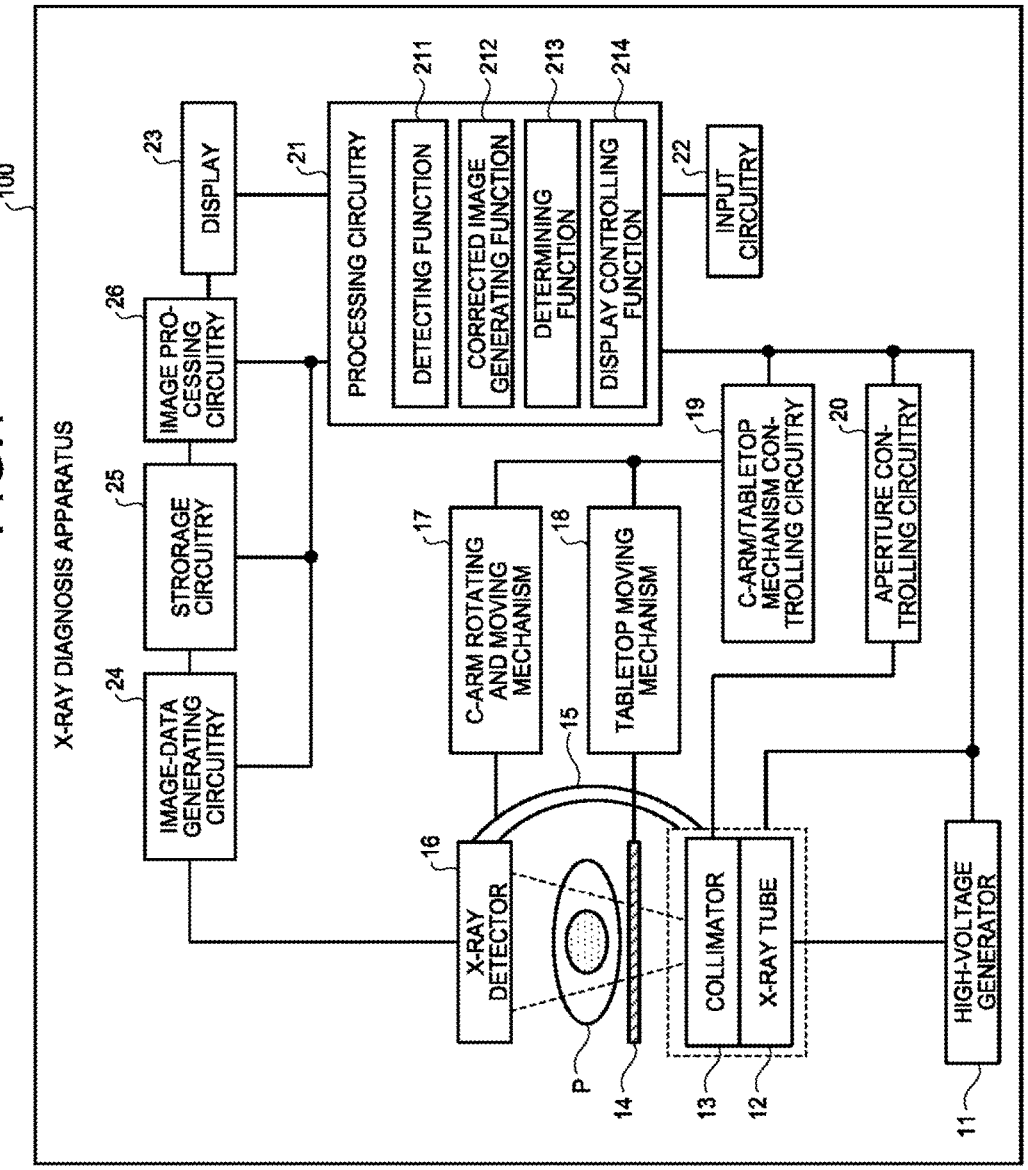

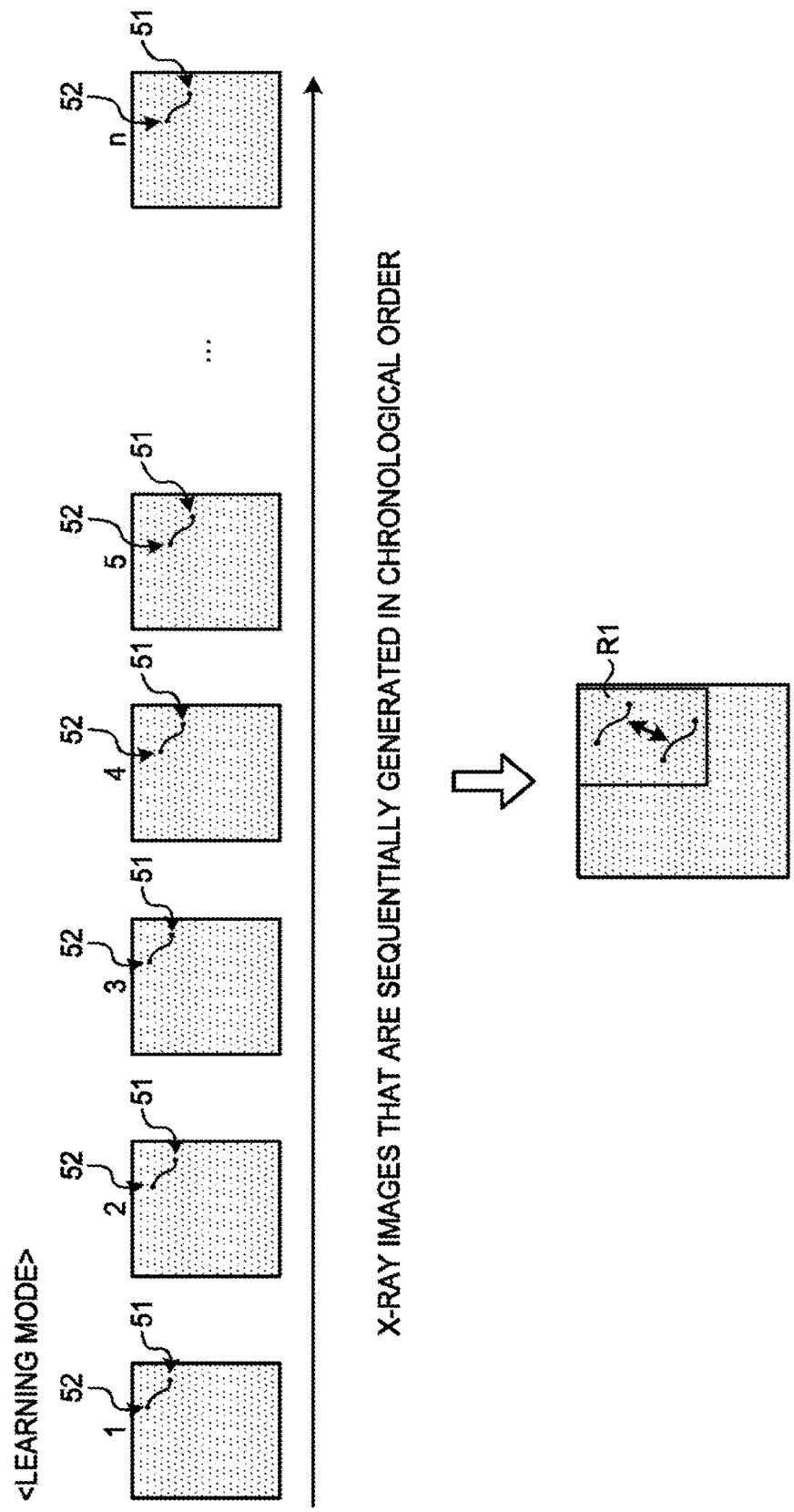

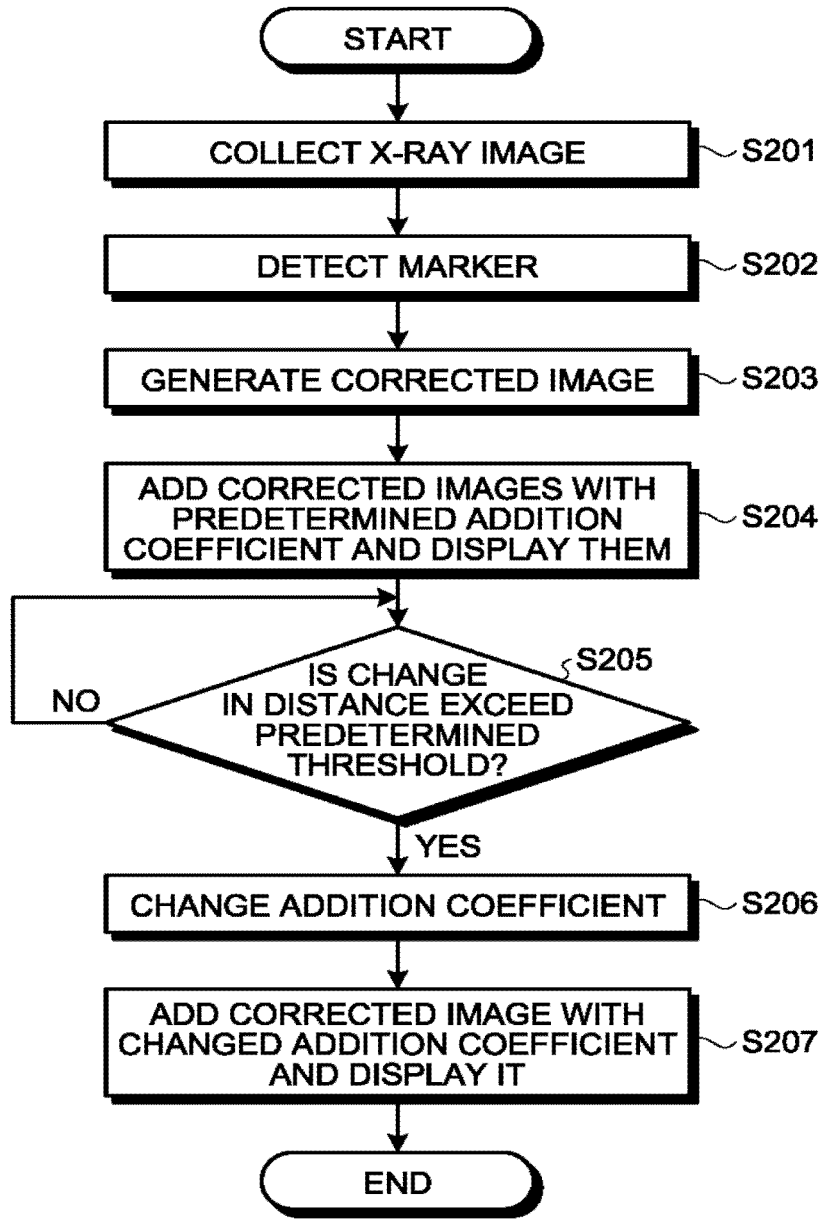

IMAGE PROCESSING APPARATUS AND X-RAY DIAGNOSIS APPARATUS

CROSS-REFERENCE TO RELATED APPLICATIONS

This application is based upon and claims the benefit of priority from Japanese Patent Application No. 2016-091547, filed on Apr. 28, 2016; the entire contents of which are incorporated herein by reference.

FIELD

Embodiments described herein relate generally to an image processing apparatus and an X-ray diagnosis apparatus.

BACKGROUND

Endovascular intervention treatments are performed by implementing a treatment method by which a treatment tool (a device) called a catheter is inserted into a blood vessel so as to treat an affected area in the heart, the brain, the liver, or the like. For example, to perform an endovascular intervention treatment, a medical doctor inserts a catheter with a balloon up to a stenosis site. After that, for example, the medical doctor expands the balloon by injecting liquid into the balloon via the catheter. As a result, the stenosis site is mechanically expanded so that the blood flow is recovered. After the liquid in the balloon is sucked out, the catheter with the balloon is pulled out of the body of the subject by the medical doctor.

Further, an endovascular intervention treatment can also be performed by using a catheter with a balloon that has a metal mesh (called a stent) being in close contact therewith on the outside thereof, for the purpose of preventing recurrence of stenosis in a stenosis site that was once expanded by the balloon. According to this treatment method, a medical doctor expands the stent by expanding the balloon, and subsequently, the liquid in the balloon is sucked out so as to pull the catheter out of the body of the subject. As a result, the expanded stent is left at the stenosis site, and it is therefore possible to reduce the possibility of stenosis recurring at the stenosis site.

To perform endovascular intervention treatments, required to move the device inserted in the blood vessel up to the treated site with an adequate level of precision. Normally, the position of the device is determining by referring to X-ray images that are generated and displayed by an X-ray diagnosis apparatus in a real-time manner. For this reason, in two locations (or in one location), the device has attached thereto metal pieces through which X-rays do not pass, for example, as markers indicating the positions of the balloon or the stent. The medical doctor determines the position of the device by referring to the one or more markers rendered in the X-ray images displayed on a monitor.

However, when an endovascular intervention treatment is performed on a blood vessel in an organ constantly having a pulsating motion such as the heart or in an organ moving due to the pulsating motion, the position of the device in the X-ray images moves constantly. Thus, determining the position of the device while referring to the X-ray images requires an extremely high level of skills of the medical doctor.

To cope with this situation, a technique is conventionally known by which, for example, a moving picture in which the device virtually appears to be stationary is displayed by tracking markers at two points that are rendered in sequentially-generated X-ray images and deforming the images in such a manner that the positions of the markers at the two points in the X-ray images are in the same positions as those in a past image. Further, as a post-processing process, another technique is also known by which the device is displayed in an enhanced manner with high contrast, for example, by calculating an arithmetic mean of images in a plurality of frames that have been corrected to arrange the positions of the markers at two points to be the same among the images.

BRIEF DESCRIPTION OF THE DRAWINGS

FIG. 1 is a diagram that illustrates an example of the configuration of an X-ray diagnosis apparatus according to a first embodiment;

FIG. 3 is a diagram that illustrates an example of the Learning mode according to the first embodiment;

FIG. 15 is a flowchart that illustrates the steps of the process of the X-ray diagnosis apparatus according to the second embodiment.

DETAILED DESCRIPTION

Figure 2A:
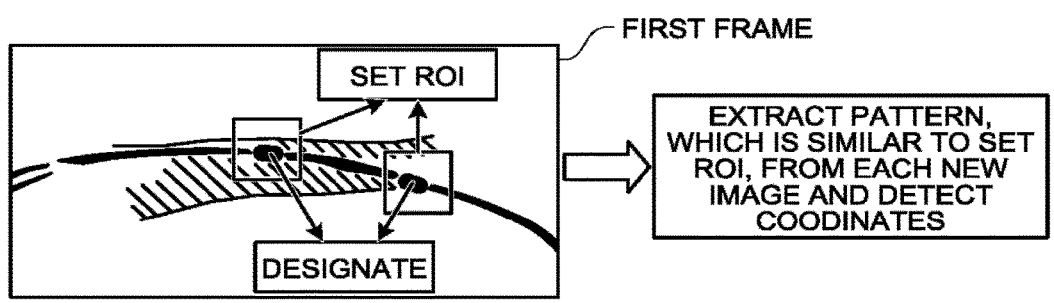
FIGS. 2A and 2B are diagrams that illustrate a process by a detecting function according to the first embodiment.

According to an embodiment, an image processing apparatus includes processing circuitry. The processing circuitry is configured to detect a position of an object included in each of sequentially generated X-ray images. The processing circuitry is configured to generate corrected images by a correction process to substantially match, with a reference position, the detected position of the object in a X-ray image generated after a reference x-ray image, the reference position being the detected position in the reference X-ray image. The processing circuitry is configured to determine an addition condition of each region of the sequentially generated corrected image. The processing circuitry is configured to cause a display to display an added image to which the corrected image is added in accordance with the determined addition condition.

With reference to the attached drawings, a detailed explanation is given below of an embodiment of an image processing apparatus and an X-ray diagnosis apparatus. Furthermore, the image processing apparatus and the X-ray diagnosis apparatus according to the subject application are not limited to the embodiments described below. Moreover, in the following explanation, an embodiment of the X-ray diagnosis apparatus is used as an example.

First Embodiment

First, an explanation is given of the overall configuration of the X-ray diagnosis apparatus according to a first embodiment. FIG. 1 is a diagram that illustrates an example of the configuration of an X-ray diagnosis apparatus 100 according to the first embodiment. As illustrated in FIG. 1, the X-ray diagnosis apparatus 100 according to the first embodiment includes a high-voltage generator 11, an X-ray tube 12, a collimator 13, a top board 14, a C arm 15, an X-ray detector 16, a C-arm rotating and moving mechanism 17, a tabletop moving mechanism 18, C-arm/tabletop mechanism controlling circuitry 19, aperture controlling circuitry 20, processing circuitry 21, input circuitry 22, a display 23, image-data generating circuitry 24, storage circuitry 25, and image processing circuitry 26.

In the X-ray diagnosis apparatus 100 illustrated in FIG. 1, each processing function is stored in the storage circuitry 25 in a form of program executable by the computer. The C-arm/tabletop mechanism controlling circuitry 19, the aperture controlling circuitry 20, the processing circuitry 21, the image-data generating circuitry 24, and the image processing circuitry 26 are processors that read and execute each program from the storage circuitry 25 so as to perform the function that corresponds to the program. In other words, after having read each program, each circuitry has the function that corresponds to the read program.

Furthermore, the term "processor" used in the above explanation means, for example, a central processing unit (CPU), a graphics processing unit (GPU), or a circuit, such as an application specific integrated circuit (ASIC), a programmable logic device (e.g., a simple programmable logic device (SPLD), a complex programmable logic device (CPLD), or a field programmable gate array (FPGA)). The processor reads and executes a program stored in the memory circuitry, thereby performing the function. Furthermore, a configuration may be such that, instead of storing a program in the memory circuitry, the program is directly installed in a circuit of the processor. In this case, the processor reads and executes the program, installed in the circuit, thereby performing the function. Moreover, with regard to the processors according to the present embodiment, each processor is not always configured as a single circuit, and multiple separate circuits may be combined to be configured as a single processor so as to perform the function.

The high-voltage generator 11 generates a high voltage under the control of the processing circuitry 21 and feeds the generated high voltage to the X-ray tube 12. The X-ray tube 12 uses the high voltage, fed from the high-voltage generator 11, to generate X-rays.

Under the control of the aperture controlling circuitry 20, the collimator 13 limits the X-rays, generated by the X-ray tube 12, so that they are selectively emitted to the region of interest of a subject P. For example, the collimator 13 has four slidable aperture blades. Under the control of the aperture controlling circuitry 20, the collimator 13 slides the aperture blades to limit X-rays, generated by the X-ray tube 12, and emits them to the subject P. The top board 14 is the bed on which the subject P is placed, and it is provided on an undepicted bed. Furthermore, the subject P is not included in the X-ray diagnosis apparatus 100.

The X-ray detector 16 detects X-rays that transmitted through the subject P. For example, the X-ray detector 16 includes detecting elements that are arranged in a matrix. Each of the detecting elements converts X-rays, transmitted through the subject P, into electric signals, stores them, and transmits the stored electric signals to the image-data generating circuitry 24.

The C arm 15 holds the X-ray tube 12, the collimator 13, and the X-ray detector 16. The X-ray tube 12 and the collimator 13 are provided such that they are opposed to the X-ray detector 16 by the C arm 15 with the subject P interposed therebetween. Here, in FIG. 1, an explanation is given of a case where the X-ray diagnosis apparatus 100 has a single plane; however, this is not a limitation on the embodiment, and there may be a case where it has a biplane.

The C-arm rotating and moving mechanism 17 is a mechanism that rotates and moves the C arm 15. Furthermore, the C-arm rotating and moving mechanism 17 is capable of changing the source image receptor distance (SID), which is the distance between the X-ray tube 12 and the X-ray detector 16. Moreover, the C-arm rotating and moving mechanism 17 is capable of rotating the X-ray detector 16 that is held by the C arm 15. The tabletop moving mechanism 18 is a mechanism that moves the top board 14.

Under the control of the processing circuitry 21, the C-arm/tabletop mechanism controlling circuitry 19 controls the C-arm rotating and moving mechanism 17 and the tabletop moving mechanism 18 so as to adjust rotation or movement of the C arm 15 and movement of the top board 14. Under the control of the processing circuitry 21, the aperture controlling circuitry 20 adjusts the aperture of the aperture blades, included in the collimator 13, thereby controlling the irradiation range of X-rays that are emitted to the subject P.

The image-data generating circuitry 24 generates image data by using the electric signals, which are converted from X-rays by the X-ray detector 16, and stores the generated image data in the storage circuitry 5. For example, the image-data generating circuitry 24 conducts current/voltage conversion, analog/digital (A/D) conversion, or parallel/serial conversion on electric signals that are received from the X-ray detector 16, thereby generating image data. Then, the image-data generating circuitry 24 stores the generated image data in the storage circuitry 25.

The storage circuitry 25 receives and stores the image data that is generated by the image-data generating circuitry 24. Furthermore, the storage circuitry 25 stores programs that correspond to various functions, which are read and executed by the circuitry illustrated in FIG. 1. For example, the storage circuitry 25 stores the program that corresponds to a detecting function 211, read and executed by the processing circuitry 21, the program that corresponds to corrected image generating function 212, the program that corresponds to a determining function 213, and the program that corresponds to a display controlling function 214.

Under the control of the processing circuitry 21 that is described later, the image processing circuitry 26 conducts various types of image processing on the image data, stored in the storage circuitry 25, to generate X-ray images. Alternatively, under the control of the processing circuitry 1 that is described later, the image processing circuitry 26 directly acquires image data from the image-data generating circuitry 24 and conducts various types of image processing on the acquired image data to generate X-ray images. Furthermore, the image processing circuitry 26 may also store X-ray images after image processing in the storage circuitry 25. For example, the image processing circuitry 26 is capable of executing various types of processing by using an image processing filter, such as a moving average (smoothing) filter, a Gaussian filter, a median filter, a recursive filter, or a bandpass filter.

The input circuitry 22 is implemented by using a trackball, a switch button, a mouse, a keyboard, or the like, for setting a region (e.g., the region of interest, such as the site of interest), or the like, or a foot switch, or the like, for emitting X-rays. The input circuitry 22 is connected to the processing circuitry 21 so that it converts input operations, received from the operator, into electric signals and outputs them to the processing circuitry 21. The display 23 presents the graphical user interface (GUI) for receiving commands from the operator or various images that are generated by the image processing circuitry 26.

The processing circuitry 1 controls the overall operation of the X-ray diagnosis apparatus 100. Specifically, the processing circuitry 21 reads programs, which correspond to the control function for controlling the overall device, from the storage circuitry 25 and executes them, thereby performing various processes. For example, the processing circuitry 21 controls the high-voltage generator 11 in accordance with an operator's command, transferred from the input circuitry 22, to adjust the voltage that is supplied to the X-ray tube 12, thereby controlling the amount or ON/Off of X-rays that are emitted to the subject P. Furthermore, for example, the processing circuitry 21 control C-arm/tabletop mechanism controlling circuitry 19 in accordance with an operator's command so as to adjust rotation or movement of the C arm 15 or movement of the top board 14. Furthermore, for example, the processing circuitry 21 controls the aperture controlling circuitry 20 in accordance with an operator's command so as to adjust the aperture of the aperture blades, included in the collimator 13, thereby controlling the irradiation range of X-rays that are emitted to the subject P.

Furthermore, in accordance with an operator's command, the processing circuitry 21 controls image-data generation processing by the image-data generating circuitry 24, and image processing, analyzing processing, or the like, by the image processing circuitry 26. Furthermore, the processing circuitry 21 controls the display 23 so as to present the GUI for receiving commands from the operator, images that are stored in the storage circuitry 25, or the like. Here, as illustrated in FIG. 1, the processing circuitry 21 according to the first embodiment performs the detecting function 211, the corrected image generating function 212, the determining function 213, and the display controlling function 214, and the details are described below. Furthermore, the above-described processing circuitry 21 is an example of a processing circuitry in claims.

The overall configuration of the X-ray diagnosis apparatus 100 is explained above. With the above configuration, the X-ray diagnosis apparatus 100 according to the present embodiment makes it possible to improve image visibility. Specifically, the X-ray diagnosis apparatus 100 makes it possible to improve visibility of X-ray images upon display of X-ray images with improved visibility of treatment equipment (device), which is displayed when endovascular intervention treatment is executed by checking the X-ray images.

For example, during an endovascular intervention treatment using a "balloon catheter having a stent" on a narrowed site of the blood vessel of the heart of the subject P, the doctor sees X-ray images, generated and displayed by the X-ray diagnosis apparatus, to set the position of the device. Here, as described above, if endovascular intervention treatment is conducted on the blood vessel of the organ, such as the heart, which beats always, or the organ that moves due to beating, the position of the device is moved on X-ray images, and therefore it is an extremely high-level task for doctors to set the position of the device by checking X-ray images.

Therefore, for example, the X-ray diagnosis apparatus 100 tracks two markers, which are drawn on sequentially generated X-ray images, deforms the image such that the positions of the two markers on each of the X-ray images are the same as the positions on the previous image, and displays the moving image in which the device virtually seems to be stopped. For example, the X-ray tube 12 emits X-rays to the region of interest (e.g., the heart) of the subject P, and the X-ray detector 16 sequentially detects the X-rays that are transmitted through the region of interest. The X-ray diagnosis apparatus 100 performs image processing on the basis of data, continuously detected by the X-ray detector 16, such that the device, included in X-ray images that are sequentially generated in chronological order, virtually seems to be stopped, and displays it as a moving image in real time.

Thus, with the X-ray diagnosis apparatus 100, it is possible to display X-ray images with improved visibility of the device that is displayed during execution of endovascular intervention treatment that is conducted by checking X-ray images, and it is possible to easily set the position of the device. However, according to the above-described technology, image visibility is sometimes decreased. Therefore, with the X-ray diagnosis apparatus 100 according to the subject application, the processing circuitry 21, which is described below in detail, makes it possible to improve image visibility during display of moving images where the device virtually seems to be stopped.

Here, an explanation is first given below of a process to display a moving image where the device virtually seems to be stopped. Furthermore, an explanation is given below of a case where the processing circuitry 21 performs various functions to control the image processing circuitry 26 for execution; however, it may be a case where the processing circuitry 21 performs the same process as the image processing circuitry 26.

The detecting function 211 controls the image processing circuitry 26 so as to use a group of image data, sequentially generated by the image-data generating circuitry 24 during a predetermined period to identify an object related to the medical device, which is inserted into inside of the body of the subject, and detects the position of the object in a newly generated X-ray image in accordance with an identifying result. That is, the detecting function 211 controls the image processing circuitry 26 so as to detect the object that is included in the X-ray image, generated from the image data. Here, the predetermined period for detecting the object and the object to be detected may determine until the detecting process is stated. For example, the predetermined period for detecting the object and the object are determined before the generation of the image data, during the generation of the image data or after the generation of the image data. For example, each time a new image, which is a new X-ray image, is stored, the detecting function 211 detects the coordinates of the stent marker, attached to the stent, or the single point (e.g., the middle point) based on the stent marker in the new image. Specifically, on the basis of the information on the stent marker that is drawn on the image, the detecting function 211 detects the position of the stent marker in sequentially generated X-ray images. For example, the detecting function 211 detects the position of the stent marker or the single point (e.g., the middle point) based on the stunt markers in sequentially generated X-ray images on the basis of the information on the stent marker that is specified by the operator, or the teacher image of the stent marker.

Here, the detecting function 211 generates an enhanced image, in which the object is enhanced, from each of the sequentially generated X-ray images, and it detects the position of the object included in each of the generated enhanced images. Specifically, the detecting function 211 generates a frequency image, which includes a predetermined frequency component, or an enhanced image, which is an image that includes a predetermined brightness value, and it detects the position of the object included in the generated enhanced image. In other words, each of the enhanced images is generated by performing a process of extracting the predetermined frequency component or performing a process of converting pixel value for extracting a pixel having the predetermined brightness value. An explanation is given below of a case where, for example, the detecting function 211 generates a frequency image. Here, the predetermined frequency component and the predetermined brightness value may determine until the detecting process is stated. For example, the predetermined frequency component and the predetermined brightness value are determined before the generation of the image data, during the generation of the image data or after the generation of the image data.

For example, the detecting function 211 generates a frequency image, which includes a predetermined frequency component, from each of the sequentially generated X-ray images, and it detects the position of the object, included in each of the generated frequency images. For example, the detecting function 211 generates a high-frequency image, which includes a high-frequency component, from each of the sequentially generated X-ray images, and it detects the coordinates of the stent marker or the single point based on the stent marker from each of the generated high-frequency images. That is, the predetermined frequency component is a frequency component that includes the component that corresponds to the object, and the detecting function 211 generates a frequency image in which the object is enhanced, and it detects the position of the object.

For example, the detecting function 211 performs smoothing processing on X-ray images, thereby generating a low-frequency image of each of the X-ray images. Then, the detecting function 211 subtracts the low-frequency image from the X-ray image to generate a high-frequency image in which low-frequency components have been removed from the X-ray image. Furthermore, the detecting function 211 detects the coordinates of the stent marker or the single point based on the stent marker from the generated high-frequency image. For example, the detecting function 211 performs the above-described processing on each of the sequentially generated X-ray images to generate a high-frequency image with regard to each of the X-ray images and detect the coordinates of the stent marker or the single point based on the stent marker, included in the generated high-frequency image. Furthermore, generation of high-frequency images is not limited to the above-described example, and for example there may be a case where it is performed by using any technique, such as processing using a bandpass filter.

Figure 2B:
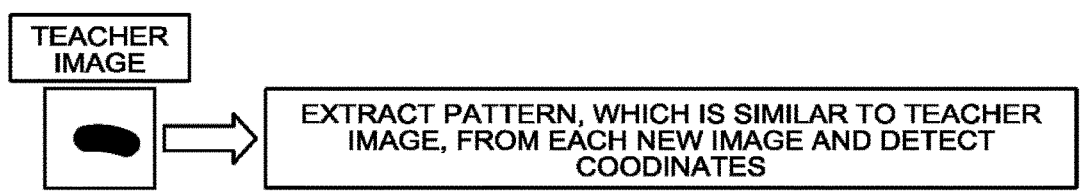

An explanation is given below of a process to display a moving image, in which the device virtually seems to be topped, in a case where, for example, the positions of the two stent markers are detected. Furthermore, an explanation is given below of a process after a high-frequency image is generated. FIGS. 2A and 2B are diagrams that illustrate a process by the detecting function 211 according to the first embodiment. For example, the display controlling function 214, described later, controls the display 23 so as to display the X-ray image (the first frame) that is first generated and is stored in the storage circuitry 25, as illustrated in FIG. 2A. The operator (e.g., the doctor), who sees the first frame, specifies the two stent markers in the first frame via the input circuitry 22 as illustrated in FIG. 2A. Thus, the detecting function 211 detects the coordinates of each of the two stent markers in the first frame.

Then, the detecting function 211 sets the rectangle with the coordinates of each of the two stent markers, specified in the first frame, at the center as a region of interest (ROI) as illustrated in FIG. 2A. Then, the detecting function 211 extracts the pattern that is similar to the pattern in the set ROT from each of the sequentially generated new images by using, for example, a cross-correlation technique, and detects that the coordinates with the highest cross-correlation value are the coordinates of the stent marker.

Here, although an explanation is given of a case where two areas of the stent markers are specified by the operator in FIG. 2A, the present embodiment is not limited thereto, and there may be a case where one area of the stent marker is specified by the operator. This case, the detecting function 211 executes the cross-correlation technique by using the ROI, which is set based on the coordinates of the specified stent marker, in the first frame to detect the coordinates of the other stent marker.

Alternatively, the detecting function 211 detects the coordinates of the stent marker by using the teacher image that describes the characteristics such as the shape or the luminance of the stent marker, which is attached to the stent that is used for actual treatment, on X-ray images. For example, as illustrated in FIG. 2B, the X-ray image of the stent marker is stored separately as the teacher image, and the detecting function 211 extracts the pattern that is similar to the teacher image in each new image and retrieves the region with the highest degree of similarity from the extracted candidate regions of the stent marker so as to detect the coordinates of the stent marker.

Here, to detect the coordinates of the stent marker from the sequentially generated X-ray images, the detecting function 211 first uses multiple X-ray images to identify (determine) the stent marker. Specifically, the detecting function 211 uses a group of sequentially generated X-ray images to determine the object, which is inserted into inside of the body of the subject and is drawn on the X-ray image, and detects the position of the object, included in a newly generated X-ray image, on the basis of a determination result. For example, the detecting function 211 uses the stent marker specified by the operator or the stent marker based on the teacher image to extract all the areas that are similar to the stent marker with regard to each of the X-ray images during a predetermined period. Then, as the stent marker, the detecting function 211 extracts the area that most looks like the stent marker overall from the areas that are extracted from the X-ray images. The above-described process to detect and identify (determine) the stent marker is hereafter referred to as the "Learning mode".

FIG. 3 is a diagram that illustrates an example of the Learning mode according to the first embodiment. FIG. 3 illustrates the Learning mode using X-ray images in n frames, generated by the image processing circuitry 26. For example, the detecting function 211 extracts all the areas (coordinates) that are similar to the stent marker from the entire area of the first frame, illustrated in FIG. 3. Then, the detecting function 211 forms pairs with regard to all the extracted coordinates and gives a score to each of the pairs in accordance with the degree of similarity, or the like. For example, the detecting function 211 gives a score to the pair of coordinates 51 and coordinates 52. Although only the coordinates 51 and the coordinates 52 are illustrated in FIG. 3, if the area (coordinates) that is similar to the stent marker is included, the coordinates are also detected, pairs are formed by using the coordinates 51, the coordinates 52, or other coordinates, and scores are given to them.

In the same manner, the detecting function 211 performs the above-described operation on the second frame to the nth frame and gives a score to each of the pairs based on all the extracted coordinates. Then, the detecting function 211 extracts the coordinates of the pair, which indicates the highest score among the frames, as the coordinates of the stent marker and extracts the region that covers the possible positions of the stent marker on the X-ray image during a predetermined period. For example, as illustrated in FIG. 3, the detecting function 211 extracts the pair of the coordinates 51 and the coordinates 52, which represent the highest score among the frames, and extracts a region R1 that covers the coordinates. Furthermore, with regard to extraction of the region R1, for example, a rectangle, which has a center in the coordinates of the middle point between the coordinates 51 and the coordinates 52, is extracted from each frame, and the region including all the extracted rectangles is extracted as the region R1.

For example, as beats of the heart, expansion/contraction of the lung, or the like, are regular (periodic), the stent marker, which moves in accordance with them, exhibits regular (periodic) movements. In the above-described Learning mode, the regularly (periodically) moving stent marker is exhaustively detected by using X-ray images during a predetermined period, and the one that most looks like the stent marker is identified (determined) as the stent marker. Furthermore, in the Learning mode, for example, X-ray images in about 40 frames are used.

As described above, in the Learning mode, the detecting function 211 first identifies (determines) the stent marker within the X-ray image and extracts the region that covers the possible positions of the stent marker. Then, the detecting function 211 detects the stent marker by using the extracted region as the target region. For example, the detecting function 211 performs an operation to detect the stent marker by using the region R1, illustrated in FIG. 3, as the region to be processed.

Figure 4A:
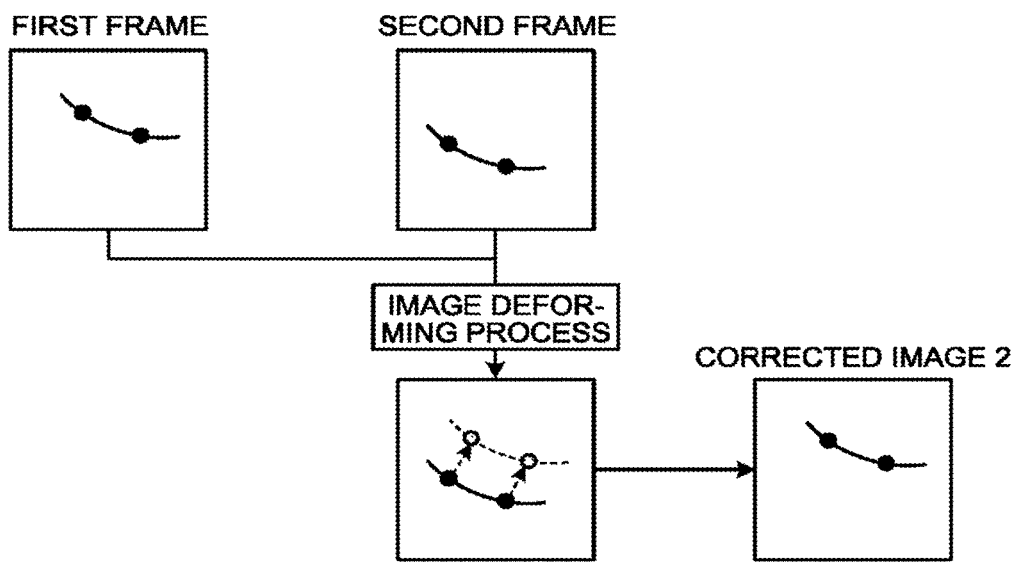
FIGS. 4A and 4B are diagrams that illustrate a process by a corrected image generating function according to the first embodiment.
Figure 4B:
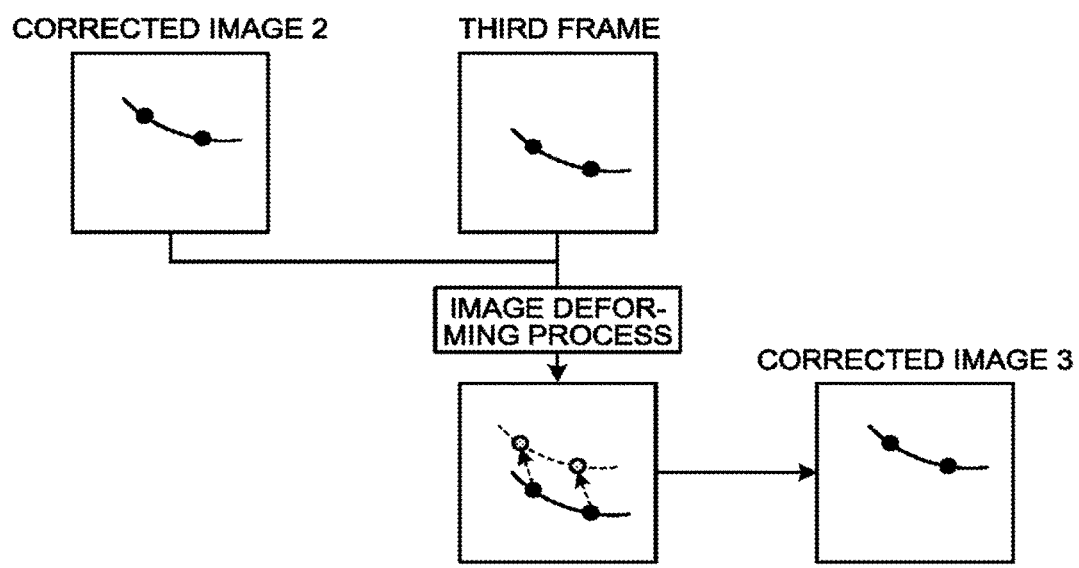

The corrected image generating function 212 controls the image processing circuitry 26 so as to generate a corrected image from a new image, where the coordinates of the stent marker, already detected by the detecting function 211, are the reference coordinates, by performing image moving processing, such as parallel movement or rotary movement, or image deforming process, such as affine transformation, so that the coordinates of the stent marker, detected from the new image by the detecting function 211, match the reference coordinates. FIGS. 4A and 4B are diagrams that illustrate a process by the corrected image generating function 212 according to the first embodiment. Here, FIGS. 4A and 4B illustrate a process on a new image from which the coordinates of the stent marker are detected on the basis of a processing result of the Learning mode after the process in the Learning mode by the detecting function 211 is finished. That is, the first frame illustrated in FIGS. 4A and 4B represent the X-ray image that is first generated after the Learning mode is finished.

For example, the detecting function 211 first perform the process in the Learning mode by using images in 40 frames, and it detects the coordinates of the stent marker by using the processing result of the Learning mode with regard to the first frame and the second frame that are generated after the Learning mode is finished, as illustrated in FIG. 4A. After the detecting function 211 detects the coordinates of the stent marker, the corrected image generating function 212 generates a corrected image 2 from the second frame by image deforming process such that the coordinates of the stent marker, detected from the X-ray image in the second frame, which is generated as a new image, match the coordinates (the reference position) of the stent marker, already detected from the first frame, as illustrated in FIG. 4A. Then, with regard to new images in the third and subsequent frames, the corrected image generating function 212 generates a corrected image by using, as the reference coordinates, the coordinates of the stent marker in the corrected image that is generated by itself from the X-ray image that is generated immediately before the new image. For example, as illustrated in FIG. 4B, the corrected image generating function 212 generates a corrected image 3 from the third frame by image deforming process such that the coordinates of the stent marker, detected from the third frame, match the coordinates of the stent marker in the corrected image that is generated from the second frame.

Furthermore, in the present embodiment, an explanation is given of a case where the coordinates of the stent marker on the corrected image, which is generated from the previous frame of the new image, are used as the reference coordinates; however, this is not a limitation on the embodiment, and there may be a case where the coordinates of the stent marker, detected from the first frame, are fixed as the reference coordinates and a corrected image is generated from a new image in the second and subsequent frames. However, as described later, corrected images are used to generate display images that are used when moving images are displayed, and therefore in order to ensure that moving images are displayed with the position of the stent marker not blurred, it is preferable to generate the corrected image from the new image by using the previous corrected image.

As described above, the corrected image generating function 212 generates corrected images where the coordinates of the stent marker, detected by the detecting function 211, are the same in images. Specifically, the corrected image generating function 212 generates corrected images where, after the stent marker is identified in the Learning mode, the coordinates of the stent marker, detected from the subsequent X-ray image by using the processing result of the Learning mode, are the same in images. The above-described process to generate corrected images is hereafter referred to as the "Tracking mode".

Figure 5:
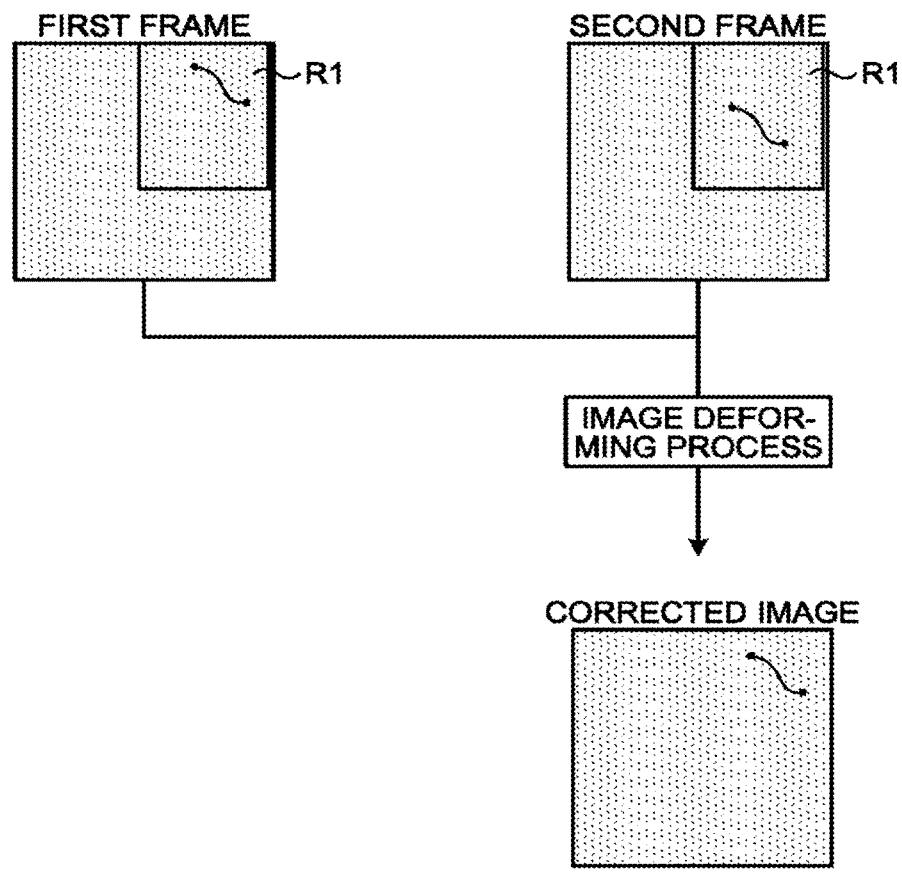
FIG. 5 is a diagram that illustrates an example of the Tracking mode according to the first embodiment.

FIG. 5 is a diagram that illustrates an example of the Tracking mode according to the first embodiment. For example, as illustrated in FIG. 5, in the Tracking mode, a corrected image is generated by image deforming process such that the position of the stent marker, detected within the region R1 that is extracted in the Learning mode, is matched. Specifically, the corrected image generating function 212 generates a corrected image, targeted for the X-ray image from which the stent marker is detected by the detecting function 211 after the Learning mode.

The display controlling function 214 causes the display 23 to display the corrected image, generated by the corrected image generating function 212, as a moving image. Specifically, each time a corrected image is newly generated in chronological order, the display controlling function 214 controls the display 23 so as to sequentially display the newly generated corrected image as a display image. That is, the display controlling function 214 performs a control to display the display images, in which the coordinates of the stunt marker are matched, as moving images. Thus, it is possible to display, as a moving image, the X-ray image where the stent area is not moved although for example the background area other than the stent is blurred.

Here, the display controlling function 214 controls the image processing circuitry 26 so as to display, as a moving image, the display image of which various filtering processes have been performed on the corrected image. For example, the display controlling function 214 controls the image processing circuitry 26 so as to perform a high-frequency noise reduction filtering process on a corrected image by using a recursive filter to generate a display image. The recursive filter is a filter that reduces high-frequency noise by adding the pixel value of a pixel, included in the previous frame that undergoes predetermined weighting, to the pixel value of a pixel included in the frame that is the target to be processed. As the coordinates of the stent marker are matched in corrected images, it is possible to improve the visibility of the stent in corrected images by reducing high-frequency noise of the stent area using the recursive filter that uses the previous frame. Here, the predetermined weight may determine until the filtering process is stated. For example, the predetermined weight is determined before the generation of the corrected images, during the generation of the corrected images or after the generation of the corrected images.

Specifically, the display controlling function 214 sequentially performs recursive filter processing using previous corrected images on sequentially generated corrected images to generate display images, in which the visibility of the device is improved, and displays them as moving images. Furthermore, the display controlling function 214 may simply add sequentially generated corrected images to generate display images.

An explanation is given above of a process to display moving images where the device virtually seems to be stopped. Furthermore, in the above-described embodiment, an explanation is given of a case where image deforming process is conducted such that the positions of the two stent markers on a newly generated X-ray image are matched with the positions of the two stent markers on the X-ray image in the first frame. However, this is not a limitation on the embodiment, and there may be a case where corrected images are generated by using the single point based on the two stent markers. Specifically, the detecting function 211 performs the Learning mode operation on the single point based on the two stent markers (e.g., the middle point between the two stent markers) to identify the position (the coordinates) and, in accordance with a processing result, detects the single point based on the stent marker on a new image. The corrected image generating function 212 generates a corrected image that is corrected such that the detected single point based on the stent markers is matched.

In such a case, the corrected image generating function 212 uses the single point and the angle that are defined based on the feature pattern detected from the X-ray image (e.g., the first frame) that is set as the reference image (the reference X-ray image). Then, the corrected image generating function 212 uses the feature pattern, which is detected from the target image, which is the target X-ray image to be corrected, the predetermined single point, and the predetermined angle to generate a corrected image from the target image. Then, the display controlling function 214 causes the display 23 to display corrected images, sequentially generated by the corrected image generating function 212, as moving images. Here, the predetermined single point and the predetermined angle may determine until the process of generating the corrected image is stated. For example, the predetermined single point and the predetermined angle are determined before the generation of the image data, during the generation of the image data or after the generation of the image data.

An explanation is given below of an example of the process (single-point fixed process) to display a moving image, where the device virtually seems to be stopped, by using the single point within an X-ray image. Here, an explanation is given below of a case where the treatment device has two feature points (e.g., the two stent markers). In this case, the detecting function 211 detects two feature points, which are provided by the device, as the feature pattern. Furthermore, the corrected image generating function 212 uses, as the predetermined single point, the single point that is determined based on the positions of the two feature points that are detected from the reference image. Furthermore, the corrected image generating function 212 uses, as the predetermined angle, the angle between the line segment, connecting the two feature points that are detected from the reference image, and the reference line on the reference image.

Figure 6:
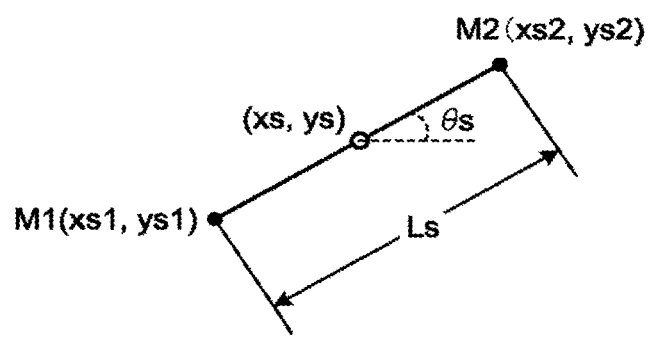
FIG. 6 is a diagram that illustrates a single-point fixed process according to the first embodiment.

FIG. 6 is a diagram that illustrates the single-point fixed process according to the first embodiment. For example, the detecting function 211 detects the position (coordinates) of each of two markers (M1 and M2) on the X-ray image in the first frame, which is set as the reference image. For example, as illustrated in FIG. 6, the detecting function 211 detects "(xs1, ys1) and (xs2, ys2)" as the positions of M1 and M2. In accordance with a detection result of the detecting function 211, the corrected image generating function 212 determines "the position (coordinates) of the single point" that is used for image deforming process. For example, as illustrated in FIG. 6, the corrected image generating function 212 calculates the central coordinates "(xs, ys)" of M1 and M2. The central coordinates are the middle point of the line segment (hereafter, a line segment M1&2) that connects M1 and M2. Specifically, "xs" is "(xs1+xs2)/2", and "ys" is "(ys1+ys2)/2". Furthermore, for example, as illustrated in FIG. 6, the corrected image generating function 212 calculates the angle "θs" between the line segment M1&2 and the reference line that is in the horizontal direction of the reference image.

Thus, "the single point and the angle", which are used during an image deforming process, are defined, and then the detecting function 211 detects the positions (the coordinates) of M1 and M2 on the target X-ray image (the target image) to be corrected, which is generated after the reference image. Then, the corrected image generating function 212 conducts image deforming process on the target image such that the position (coordinates) of the middle point of the line segment M1&2 on the target image is (xs, ys) and the angle between the line segment M1&2 and the reference line is "θs". That is, during the single-point fixed process, image deforming process is conducted on the target image such that the device, which is drawn on a corrected image, passes through the same single point and the device, drawn on a corrected image, is tilted at the same angle. Then, the display controlling function 214 causes the display 23 to display corrected images, sequentially generated by the corrected image generating function 212, as moving images.

Figure 7:
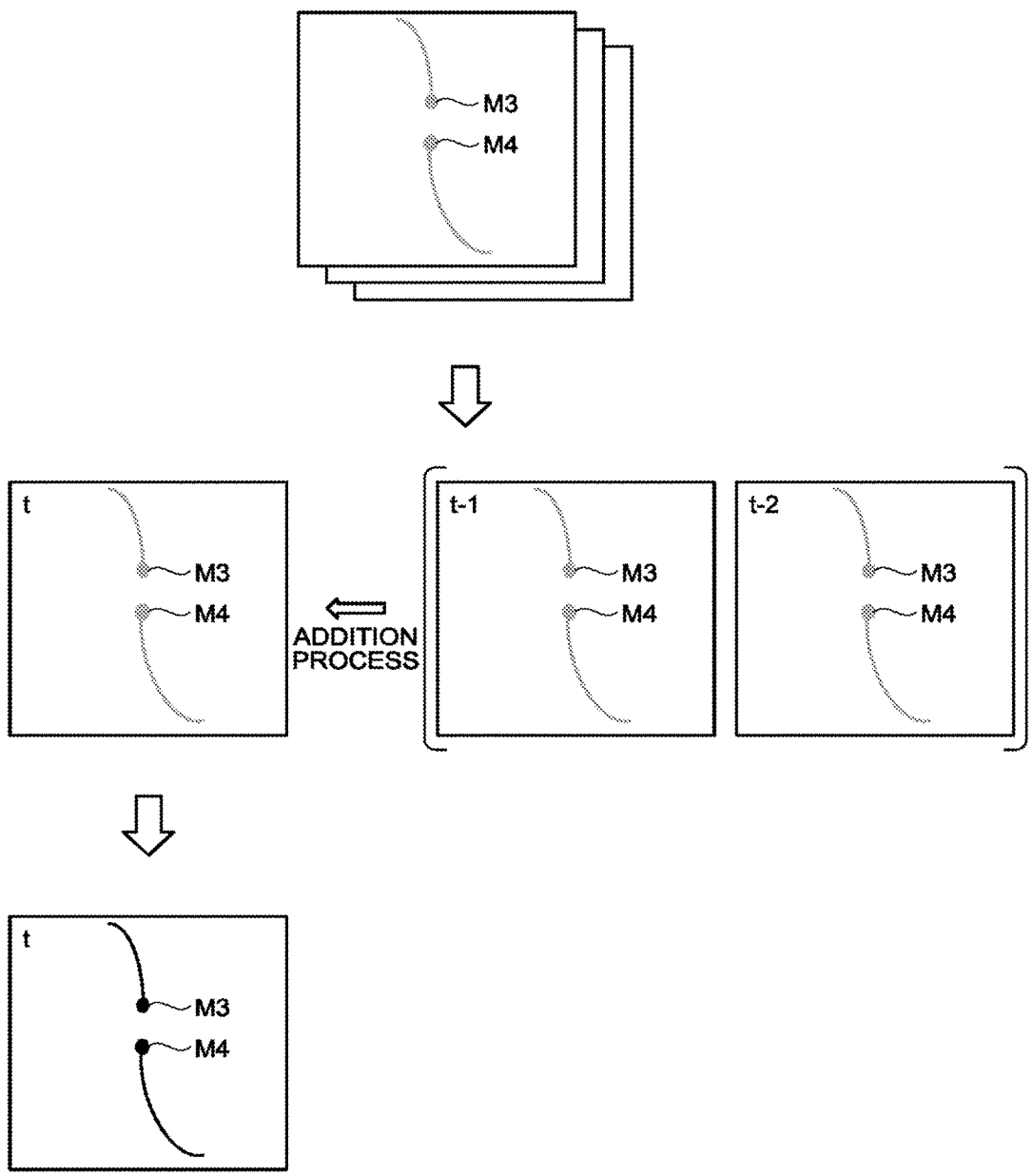
FIG. 7 is a diagram that illustrates an example of an addition process according to the first embodiment.

An explanation is given above of the process to display moving images where the device virtually seems to be stopped. The X-ray diagnosis apparatus 100 according to the subject application improves image visibility during display of moving images where the above-described device virtually seems to be stopped. As described above, upon display of moving images where the device is virtually stopped, the display controlling function 214 controls the image processing circuitry 26 so as to present display images that undergo an addition process to add a previous corrected image in order to improve the visibility of the device. FIG. 7 is a diagram that illustrates an example of the addition process according to the first embodiment. Here, FIG. 7 illustrates an example of the addition process in the case of displaying moving images, in which the device is virtually stopped, by matching the positions of two markers with the reference positions.

For example, after the detecting function 211 detects each of the two markers in each frame (high-frequency image) and the corrected image generating function 212 performs an image deforming process to match the positions of the two markers with the reference positions on each X-ray image so as to generate a corrected image, the display controlling function 214 generates a display image that undergoes an addition process to add a previous corrected image to a newly generated corrected image. For example, as illustrated in FIG. 7, after a marker M3 and a marker M4 are detected from each frame and each corrected image is generated, the display controlling function 214 generates the display image at "the time t" by performing an addition process to add the corrected image (the corrected image at the time t-1 or the time t-2 in the drawing), generated from the previous frame, to the corrected image (the corrected image at the time t in the drawing) generated from the latest frame.

As illustrated in FIG. 7, the display image, generated by performing the addition process as described above, is the image where the values of the pixels that represent the marker M3 and the marker M4 or the catheter with the marker are added for highlight. Thus, the observer may observe the image where the device is enhanced in the moving image where the device is virtually stopped. However, when this addition process is performed, there is a case where if misaligned objects are included in the frames to be added, they are not added successfully and they are drawn like a residual image, which results in a reduction in image visibility.

Figure 8:
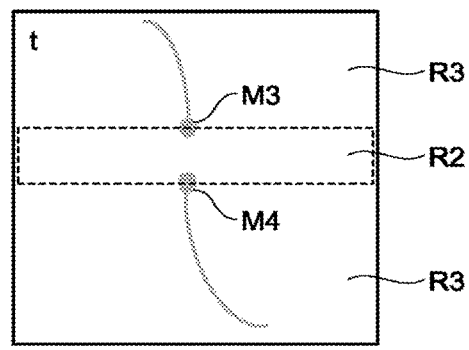
FIG. 8 is a diagram that illustrates the details of a process by a determining function according to the first embodiment.

Therefore, the X-ray diagnosis apparatus 100 according to the first embodiment generates display images with improved image visibility upon display of images where the device is enhanced and moving images where the device is virtually stopped. Specifically, the determining function 213 determines the addition coefficient for each region of the corrected image that is sequentially generated by the corrected image generating function 212. FIG. 8 is a diagram that illustrates the details of a process by the determining function 213 according to the first embodiment. For example, the determining function 213 determines the addition coefficient for a region R2 and a region R3 that are illustrated in FIG. 8. For example, with regard to each region within a corrected image, the determining function 213 determines the number of images to be added by a recursive filter, the weighting coefficient of each image, or the like. Alternatively, with regard to each region within a corrected image, the determining function 213 determines the number of images to be added during a simple addition process, or the like.

For example, the determining function 213 determines the amount of addition of the recursive filter and the weighting coefficient of each image with regard to the region R2 in FIG. 8 and the amount of addition of the recursive filter and the weighting coefficient of each image with regard to the region R3 in FIG. 8. Here, the determining function 213 determines the addition coefficient on the basis of changes in the pixel value of the corrected image that is sequentially generated by the corrected image generating function 212. For example, the determining function 213 determines the addition coefficient such that the amount of addition of a corrected image is lower if a change in the pixel value of the corrected image exceeds a predetermined threshold.

Specifically, the determining function 213 measures changes in the pixel value of each region with regard to corrected images that are sequentially generated by the corrected image generating function 212, and it determines the addition coefficient of each region on the basis of the measured change. For example, the determining function 213 measures changes in the pixel value of each pixel within the region R2 of the corrected image that is sequentially generated with time so as to determine the movements of the drawn object, which is drawn within the region R2, in the corrected images and, if the movement of the drawn object in the corrected images exceeds a predetermined threshold, changes the addition coefficient of the region R2. In other words, if the position of the drawn object, included in the region R2, is moved in the corrected images, the determining function 213 changes the addition coefficient of the region R2. The determining function 213 performs the above-described determination process and the process to change the addition coefficient on each region of corrected images. Here, the predetermined threshold may determine until the adding process is stated. For example, the predetermined threshold is determined before the generation of the corrected images, during the generation of the corrected images or after the generation of the corrected images.

Here, as a region of a corrected image, for example, the determining function 213 may set a region between objects in a corrected image. For example, the determining function 213 determines the addition coefficient of the first region between objects (e.g., the markers) in a corrected image and the addition coefficient of a region different from the first region in the corrected image. Specifically, as illustrated in FIG. 6, on the basis of the object (the marker, or the like) whose position is matched in corrected images upon display of the moving image where the device is virtually stopped, the determining function 213 sets the region R2 (the first region) between the markers and a region other than the region R2 (a region other than the first region) as the region whose addition coefficient is changed. Furthermore, the above-described region setting is only an example, and the target region whose addition coefficient is changed may be arbitrarily set. Here, the region of a corrected image may determine until the adding process is stated. For example, the region of a corrected image is determined before the generation of the corrected images, during the generation of the corrected images or after the generation of the corrected images.

Figure 9:
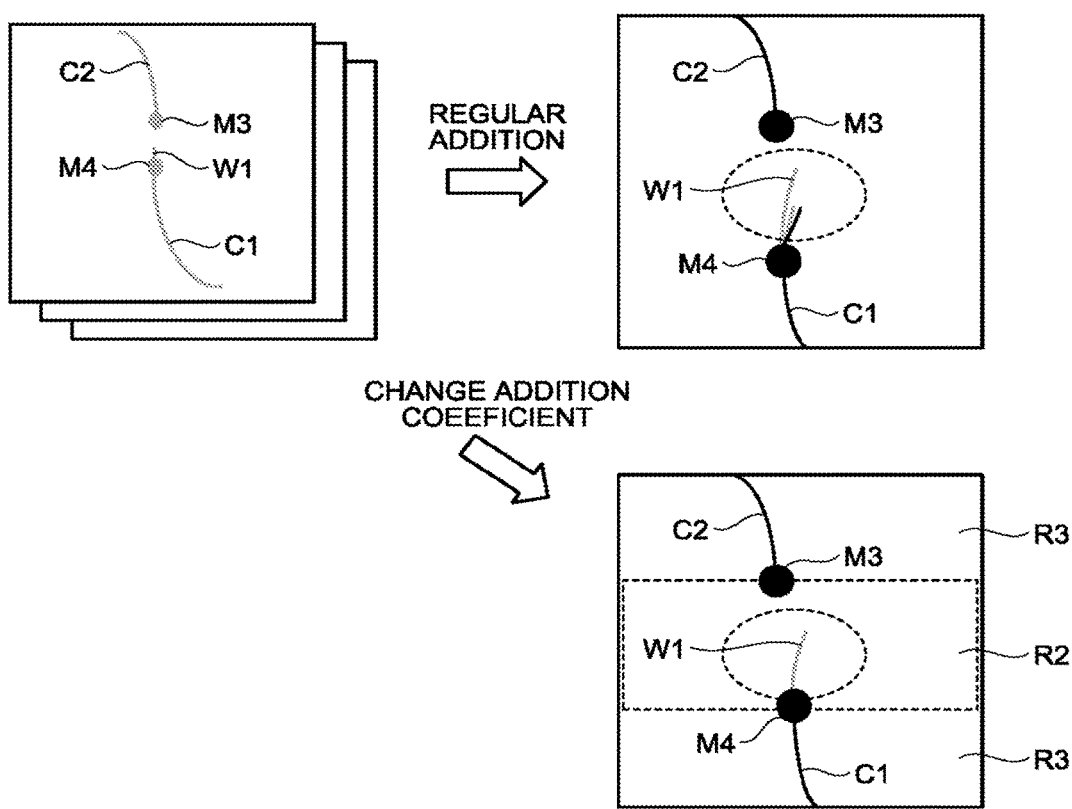
FIG. 9 is a diagram that illustrates an example of the determination process by the determining function according to the first embodiment.
Figure 10:
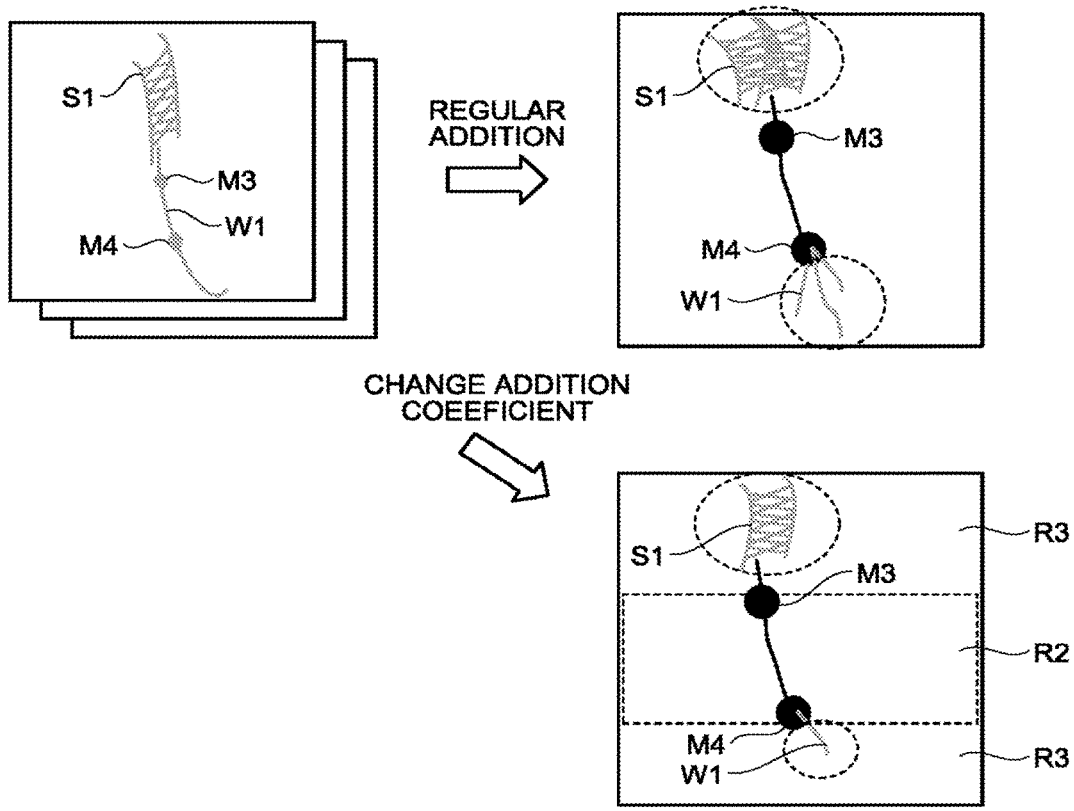
FIG. 10 is a diagram that illustrates an example of the determination process by the determining function according to the first embodiment.

With reference to FIGS. 9 and 10, an explanation is given below of a process to change the addition coefficient of each region by the determining function 213. FIGS. 9 and 10 are diagrams that illustrate an example of the determination process by the determining function 213 according to the first embodiment. Here, FIGS. 9 and 10 illustrate a case where image deforming process is conducted such that the positions of two markers are matched in each corrected image and a display image is generated by adding a corrected image. Furthermore, FIGS. 9 and 10 illustrate a case where the region between the markers and a region other than the region between the markers are the target regions for the process to change the addition coefficient.

First, an explanation is given of the process in FIG. 9. FIG. 9 illustrates a case where a catheter C1 and a catheter C2 are located within the blood vessel and a wire W1 within the catheter C1 is further moved upward. In such a case, the detecting function 211 first detects the positions of the marker M3 and the marker M4 included in each frame. Then, the corrected image generating function 212 performs an image deforming process to match each of the marker M3 and the marker M4, detected by the detecting function 211, thereby sequentially generating corrected images. The determining function 213 measures changes in the pixel value of the region between the marker M3 and the marker M4 (the inner side region of the marker M3 and the marker M4) in a sequentially generated corrected image. In the same manner, the determining function 213 measures changes in the pixel value of the region outside the marker M3 and the region outside the marker M4 in a sequentially generated corrected image.

Here, if a change in the pixel value exceeds the predetermined threshold, the determining function 213 changes the addition coefficient so as to lower the amount of previous frames to be added with regard to the region whose change in the pixel value exceeds the predetermined threshold. For example, with respect to the region for which the predetermined threshold is exceeded, the determining function 13 decreases the number of previous frames to be added or decreases a weight by the recursive filter. In the case of FIG. 9, as the wire W1 within the catheter G1 is further moved upward, the wire W1 is moved between the marker M3 and the marker M4. Therefore, if the addition process of the recursive filter, or the like, is performed on the entire image as usual, the wires W1, which are located at different positions in corrected images, are drawn on the display image and they are observed as residual images, as illustrated in the dotted-line ellipse in the upper section on the right side of FIG. 9.

Therefore, the determining function 213 measures changes in the pixel value of each region and changes the addition coefficient in accordance with a measurement result. For example, the determining function 213 measures changes in the pixel value of the region between the marker M3 and the marker M4 in a sequentially generated corrected image and, if a change in the pixel value in accordance with a movement of the wire W1 exceeds the threshold, changes the addition coefficient for the region between the marker M3 and the marker M4. For example, the determining function 213 does not perform the addition process on the region R2 between the marker M3 and the marker M4, as illustrated in the lower section on the right side of FIG. 9, or it makes changes, such as decreasing the number of frames to be added. Thus, as illustrated in the dotted-line ellipse in the lower section on the right side of FIG. 9, the wires W1, which are located in different positions in corrected images, are not drawn on the display image, and only the wire W1 in the current frame is observed. Furthermore, with regard to the regions R3 outside the marker M3 and outside the marker M4, as a change in the pixel value does not exceed the threshold, the addition process is performed as it is set by default; thus, it is possible to present the display image where the catheter C1, the catheter C2, the marker M3, and the marker M4 are enhanced, as illustrated in FIG. 9.

Furthermore, the process to determine changes in the pixel value may be performed on any target frames. For example, the determining function 213 may use, as the reference, the pixel value of each pixel in each region of the corrected image that is first generated after the Learning mode to compare the reference with the pixel value in each region of each subsequently generated corrected image so as to determine changes in the pixel value. Furthermore, the determining function 213 may determine changes in the pixel value by comparing the pixel value of each pixel in each region of a corrected image with the pixel value in each region of the corrected image that is previous in chronological order. Moreover, the determining function 213 may determine changes in the pixel value by making a comparison with the pixel value in each region of the previous corrected images that correspond to the number of images to be added, which is set by default.

Furthermore, the threshold that is used for the process to determine changes in the pixel value may be arbitrarily set. For example, the determining function 213 changes the addition coefficient if the number of pixels, by which the region indicating the predetermined pixel value is moved in corrected images to be compared, exceeds the predetermined threshold. For example, if the position of the pixel value indicating the wire W1 is changed by 5 pixels, the determining function 213 changes the addition coefficient of the region R2. Here, the predetermined pixel value may determine until the adding process is stated. For example, the predetermined pixel value is determined before the generation of the corrected images, during the generation of the corrected images or after the generation of the corrected images.

Furthermore, the addition coefficient, by which corrected images are added, may be arbitrarily set. For example, if the determining function 213 determines that the pixel value is changed, it is possible to specify the setting such that the addition process is not performed or the number of previous corrected images to be added is lowered. Furthermore, there may be a case where the addition coefficient is changed in accordance with the detection state of changes in the pixel value by the determining function 213. For example, multiple thresholds are set and, if a change in the pixel value exceeds a first threshold, the determining function 213 determines that the number of images to be added or the weighting coefficient is lowered. Then, if a change in the pixel value exceeds a second threshold, which is higher than the first threshold, the determining function 213 determines that the addition process is not performed.

Furthermore, the determining function 213 may extract the corrected image, which is used during the addition process, from the previous corrected images and determine that the addition process is performed by using the extracted corrected image. For example, with regard to each region of the corrected image at the present moment, the determining function 213 extracts, from the previous corrected images, the corrected image that has the state of the pixel value that is similar to the state of the pixel value in the region and determine that the addition process is performed by using the extracted corrected image.

As described above, the determining function 213 determines changes in the pixel value with regard to each region of the corrected image that is generated with time, and it changes the addition coefficient with regard to the region whose change in the pixel value exceeds the predetermined threshold. Thus, residual images of the part that is moved in a moving image may be deleted, and image visibility may be improved. Changing the addition coefficient as described above may be conducted on any region within corrected images. In the above-described FIG. 9, an explanation is given of a case where the addition coefficient is changed for the region R2 between the marker M3 and the marker M4. In FIG. 10, an explanation is given of an example where the addition coefficient is changed for the regions R3 outside the marker M3 and outside the marker M4.

FIG. 10 illustrates the case where a stent S1 is placed inside the blood vessel while the wire W1 having the marker M3 and the marker M4 is moved within the blood vessel to place another stent in the blood vessel. In such a case, the detecting function 211 first detects the positions of the marker M3 and the marker M4 included in each frame. Then, the corrected image generating function 212 performs an image deforming process to match the marker M3 and the marker M4, detected by the detecting function 211, thereby sequentially generating corrected images. In the same manner as in the above-described case of FIG. 9, the determining function 213 measures changes in the pixel value of the region between the marker M3 and the marker M4 (the inner side region of the marker M3 and the marker M4) in the sequentially generated corrected image and changes in the pixel value of the region outside the marker M3 and the region outside the marker M4 so as to change the addition coefficient.

In the case of FIG. 10, as the wire W1 is moved within the blood vessel, the entire wire M1 is moved. Therefore, if image deforming process is conducted to match the positions of the marker M3 and the marker M4, each of the markers and the part of the wire W1 between the markers are observed as if they are stopped. Specifically, with regard to the region R2 that includes each of the markers and the part of the wire W1 between the markers, as the positions thereof are matched in corrected images, residual images are not observed even if the addition process is performed. However, with regard to the regions R3 other than the region R2, as the positions thereof are not matched in corrected images, residual images are observed. For example, in FIG. 10, if the addition process of the recursive filter, or the like, is performed on the entire image as usual, the stent. S1, which is located at different positions in corrected images, and the wire W1 located within the region R3 are drawn on a display image, and they are observed like residual images, as illustrated in the dotted-line ellipse in the upper section on the right side of FIG. 10.

Therefore, the determining function 213 measures changes in the pixel value of each region to detect changes in the pixel value in the region R3 and changes the addition coefficient of the region R3. Thus, as illustrated in the dotted-line ellipse in the lower section on the right side of FIG. 10, the stent S1, which is located at different positions in corrected images, and the wire W1 within the region R3 are not drawn on a display image, and only the stent S1 and the wire W1 in the current frame are observed. Furthermore, with respect to the region R2 between the marker M3 and the marker M4, as changes in the pixel value do not exceed the threshold, the addition process is performed as it is set by default so that it is possible to present the display image where the marker M3, the marker M4, and the wire W1 are enhanced, as illustrated in FIG. 9. Furthermore, in FIG. 10, the process to determine changes in the pixel value, setting of the threshold, setting of the addition coefficient, or the like, is performed as is the case with the process in FIG. 9.

In the above-described embodiment, an explanation is given of a case where the addition coefficient is changed in accordance with changes in the pixel value of each region. However, this is not a limitation on the embodiment, and for example there may be a case where the addition coefficient is changed at any timing. In such a case, the input circuitry 22 receives input operations for presenting display images (added images) on the display 23. If the input circuitry 22 receives input operations, the display controlling function 214 presents display images on the display 23.

Figure 11:
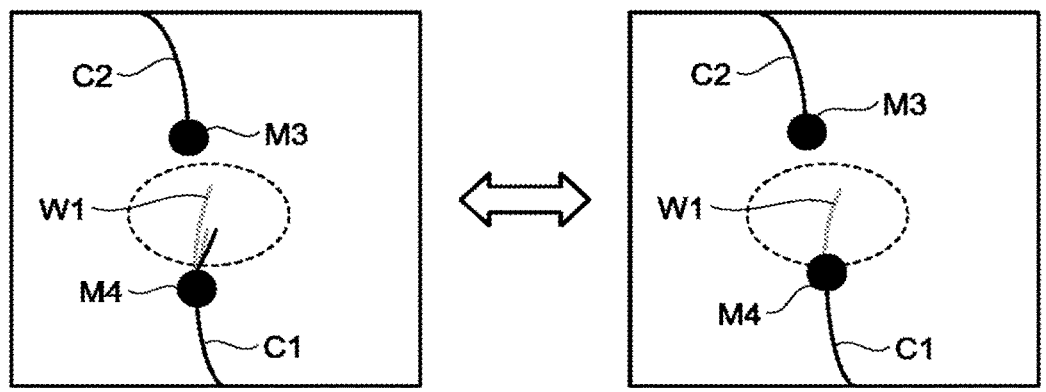
FIG. 11 is a diagram that illustrates a process to switch a display image according to the first embodiment.

FIG. 11 is a diagram that illustrates a process to switch a display image according to the first embodiment. For example, if the input circuitry 22 receives an operation to switch a display image, the display controlling function 214 presents the display image, which corresponds the received switching operation, on the display 23 as illustrated in FIG. 11. For example, if the input circuitry 22 receives an operation to present a display image where residual images are reduced (the number of images to be added or the weighting coefficient is reduced) while the display image, which undergoes the addition process by using the default addition coefficient, is presented, the display controlling function 214 presents the display image in which the addition coefficient is changed with regard to the region between the marker M3 and the marker M4, of which changes in the pixel value in corrected images exceeds the threshold, as illustrated in the diagram on the right side of FIG. 11.

Furthermore, the input circuitry 22 may receive an operation to present a display image that undergoes the addition process by using the default addition coefficient. For example, if the input circuitry 22 receives an operation to present the display image that undergoes the addition process by using the default addition coefficient while the display image, of which the addition coefficient is changed, is presented, the display controlling function 214 presents the display image where the residual image of the wire W1 is drawn on the region between the marker M3 and the marker M4, as illustrated in the diagram on the left side of FIG. 11.

Furthermore, in the above-described embodiment, an explanation is given of a case where changes in the pixel value of the region R2 between the markers and the region R3 other than the region R2 are measured and the addition coefficient is changed in accordance with a measurement result. However, this is not a limitation on the embodiment and for example there may be a case where changes in the pixel value of any region is measured and the addition coefficient is changed in accordance with a measurement result. In such a case, the input circuitry 22 receives an operation designate a region in a corrected image. The determining function 213 determines the addition coefficient of the region in the corrected image, received by the input circuitry 22. That is, the determining function 213 measures changes in the pixel value with regard to the region that is set via the input circuitry 22 and changes the addition coefficient in accordance with a measurement result.

Figure 12:
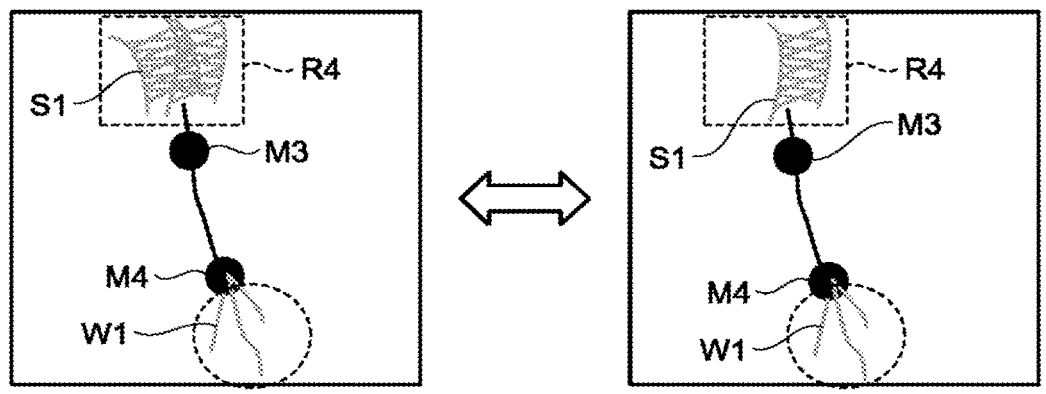
FIG. 12 is a diagram that illustrates area setting according to the first embodiment.

FIG. 12 is a diagram that illustrates region setting according to the first embodiment. For example, as illustrated in the diagram on the left side of FIG. 12, the input circuitry 22 receives setting of a region R4 within the display image that undergoes the addition process by using the default addition coefficient. Specifically, the observer observes the display image, which undergoes the addition process by using the default addition coefficient, and sets for example the region that interferes with observation (the region where residual images are noticeable) via the input circuitry 22. For example, as illustrated in the diagram on the left side of FIG.

12, if the input circuitry 22 receives the setting of the region R4, in which the stent S1 is observed like a residual image, the determining function 213 measures changes in the pixel value with regard to the region R4 in a sequentially generated corrected image. Then, if a change in the pixel value exceeds the predetermined threshold, the determining function 213 changes the addition coefficient. Thus, as illustrated in the diagram on the right side of FIG. 12, the display controlling function 214 presents the display image in which the residual image of the stent S1 is not drawn in the region R4. Here, as the region other than the region R4 is not the target for the process to change the addition coefficient, the residual image of the wire W1 is observed as illustrated in the diagram on the right side of FIG. 12.

As described above, after the determining function 213 determines the addition coefficient, the display controlling function 214 causes the display 23 to present the display image, to which a corrected image is added, on the basis of the addition coefficient that is determined by the determining function 213. That is, the display controlling function 214 causes the display 23 to present the display image that undergoes the addition process by using the addition coefficient that is determined for each region. As described above, the addition coefficient is determined for each region, and the display image, which undergoes the addition process, is presented on the display 23; thus, observers may observe images with high visibility.

Figure 13:
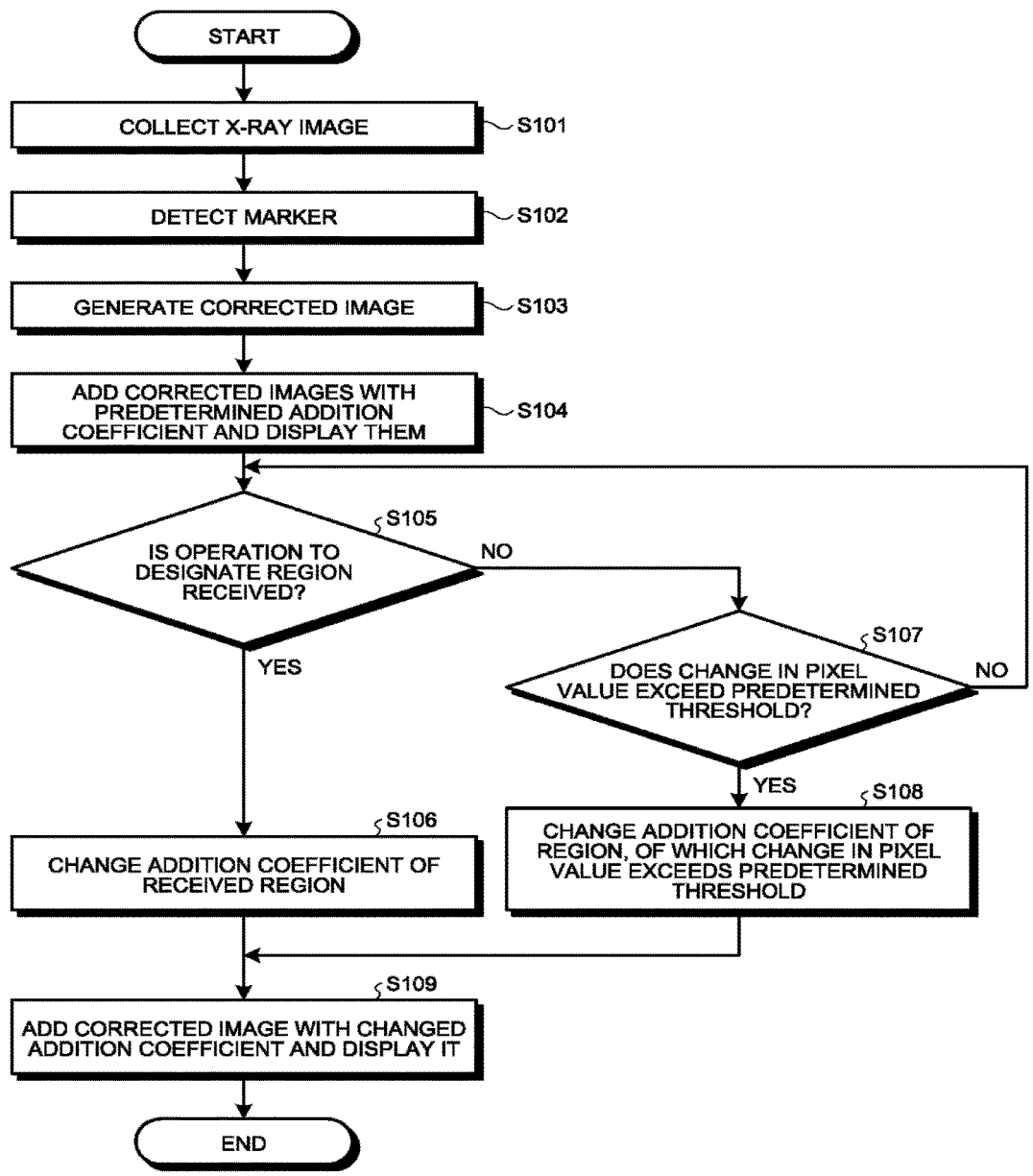
FIG. 13 is a flowchart that illustrates the steps of the process of the X-ray diagnosis apparatus according to the first embodiment.

Next, with reference to FIG. 13, an explanation is given of a process of the X-ray diagnosis apparatus 100 according to the first embodiment. FIG. 13 is a flowchart that illustrates the steps of the process of the X-ray diagnosis apparatus 100 according to the first embodiment. Step S101 illustrated in FIG. 13 is the step that is executed when the processing circuitry 21 reads the program that corresponds to the control function from the storage circuitry 25. Furthermore, Step S102 is the step that is executed when the processing circuitry 21 reads the program that corresponds to the detecting function 211 from the storage circuitry 25. Furthermore, Step S103 is the step that is executed when the processing circuitry 21 reads the program that corresponds to the corrected image generating function 212 from the storage circuitry 25. Furthermore, Steps S104 and S109 are the steps that are executed when the processing circuitry 21 reads the program that corresponds to the display controlling function 214 from the storage circuitry 25. Moreover, Steps S105 to S108 are the steps that are executed when the processing circuitry 21 reads the program that corresponds to the determining function 213 from the storage circuitry 25.

At Step S101, the processing circuitry 21 collects X-ray images. At Step S102, the processing circuitry 21 detects the marker from each of the collected X-ray images. At Step S103, the processing circuitry 21 conducts image deforming process on the X-ray image on the basis of the position of the marker, thereby generating a corrected image. At Step S104, the processing circuitry 21 adds corrected images with the predetermined addition coefficient and display them. Here, the predetermined addition coefficient may determine until the displaying process is stated. For example, the predetermined addition coefficient is determined before the generation of the image data, during the generation of the image data or after the generation of the image data.

At Step S105, the processing circuitry 21 determines whether the operation to designate the region is received. Here, if the operation to designate the region is received (Yes at Step S105), the processing circuitry 21 changes the addition coefficient of the received region at Step S106. Conversely, if the operation to designate the region is not received (No at Step S105), the processing circuitry 21 determines whether a change in the pixel value of each region of the corrected image exceeds the predetermined threshold at Step S107.

Here, if a change in the pixel value exceeds the predetermined threshold (Yes at Step S107), the processing circuitry 21 changes the addition coefficient of the region, of which a change in the pixel value exceeds the predetermined threshold, at Step S108. Conversely, if a change in the pixel value does not exceed the predetermined threshold (No at Step S107), the processing circuitry 21 returns to Step S105. After the addition coefficient is changed at Step S106 or S108, the processing circuitry 21 presents the display image, to which a corrected image is added with the changed addition coefficient, at Step S109.

As described above, according to the first embodiment, the detecting function 211 detects the position of the object included in each of the sequentially generated X-ray images. The corrected image generating function 212 uses the position of the object, which is detected from the reference image included in the X-ray images, as the reference position and sequentially generates a corrected image that undergoes a correction process to match the position of the object, detected in a newly generated X-ray image, with the reference position. The determining function 213 determines the addition coefficient of each region of the corrected image that is sequentially generated by the corrected image generating function 212. The display controlling function 214 causes the display 23 to present the added image, to which the corrected image is added on the basis of the addition coefficient that is determined by the determining function 213. Therefore, the X-ray diagnosis apparatus 100 according to the first embodiment is capable of generating and presenting a display image, in which the addition coefficient is changed for each region, and it is capable of improving the visibility upon display of moving images where the device virtually seems to be stopped.

Furthermore, according to the first embodiment, the determining function 213 determines the addition coefficient on the basis of changes in the pixel value of the corrected image that is sequentially generated by the corrected image generating function 212. Therefore, the X-ray diagnosis apparatus 100 according to the first embodiment may determine the addition coefficient for the target object whose position is changed in corrected images that are generated with time and may accurately present display images from which residual images are removed.

Furthermore, according to the first embodiment, if a change in the pixel value of the corrected image exceeds predetermined threshold, the determining function 213 determines the addition coefficient such that the amount of corrected images to be added is reduced. Therefore, the X-ray diagnosis apparatus 100 according to the first embodiment may determine the addition coefficient for the target object which is largely changed among the objects that are changed in position in corrected images that are generated with time and may remove residual images efficiently.

Furthermore, according to the first embodiment, the determining function 213 determines the addition coefficient of the first region, which is between objects in a corrected image, and the addition coefficient of the region that is different from the first region in the corrected image. Therefore, the X-ray diagnosis apparatus 100 according to the first embodiment may efficiently remove residual images from moving images where the device is virtually stopped.

Furthermore, according to the first embodiment, the input circuitry 22 receives operations to designate a region in a corrected image. The determining function 213 determines the addition coefficient of the region in the corrected image, received by the input circuitry 22. Therefore, the X-ray diagnosis apparatus 100 according to the first embodiment makes it possible for observers to change the addition coefficient for the desired region.

Moreover, according to the first embodiment, the input circuitry 22 receives input operations for causing the display 23 to present display images of which the addition coefficient is changed. When the input circuitry 22 receives an input operation, the display controlling function 214 causes the display 23 to present display images of which the addition coefficient is changed. Therefore, the X-ray diagnosis apparatus 100 according to the first embodiment makes it possible for observers to change the addition coefficient at the desired timing.

Second Embodiment

In the above-described first embodiment, an explanation is given of a case where the addition coefficient is changed for each region. In a second embodiment, an explanation is given of a case where the addition coefficient of the entire image is changed. Here, the X-ray diagnosis apparatus 100 according to the second embodiment is different from that in the first embodiment in the details of the process by the determining function 213. They are primarily explained below.

The determining function 213 according to the second embodiment determines the addition coefficient of the corrected image, sequentially generated by the corrected image generating function 212, in accordance with a change in the distance that is calculated on the basis of the position of an object. Specifically, with regard to X-ray images that are sequentially generated, the determining function 213 calculates the distance from the middle point between objects, detected from a single X-ray image, to a predetermined position and, if a change in the calculated distance exceeds a predetermined threshold, determines the addition coefficient such that the amount of corrected images to be added is reduced. For example, the determining function 213 changes the addition coefficient of the entire image if a change in the distance from the middle point between two markers to the marker exceeds the predetermined threshold. Here, the predetermined position may determine until the adding process is stated. For example, the predetermined position is determined before the generation of the corrected image, during the generation of the corrected image or after the generation of the corrected image.

Figure 14:
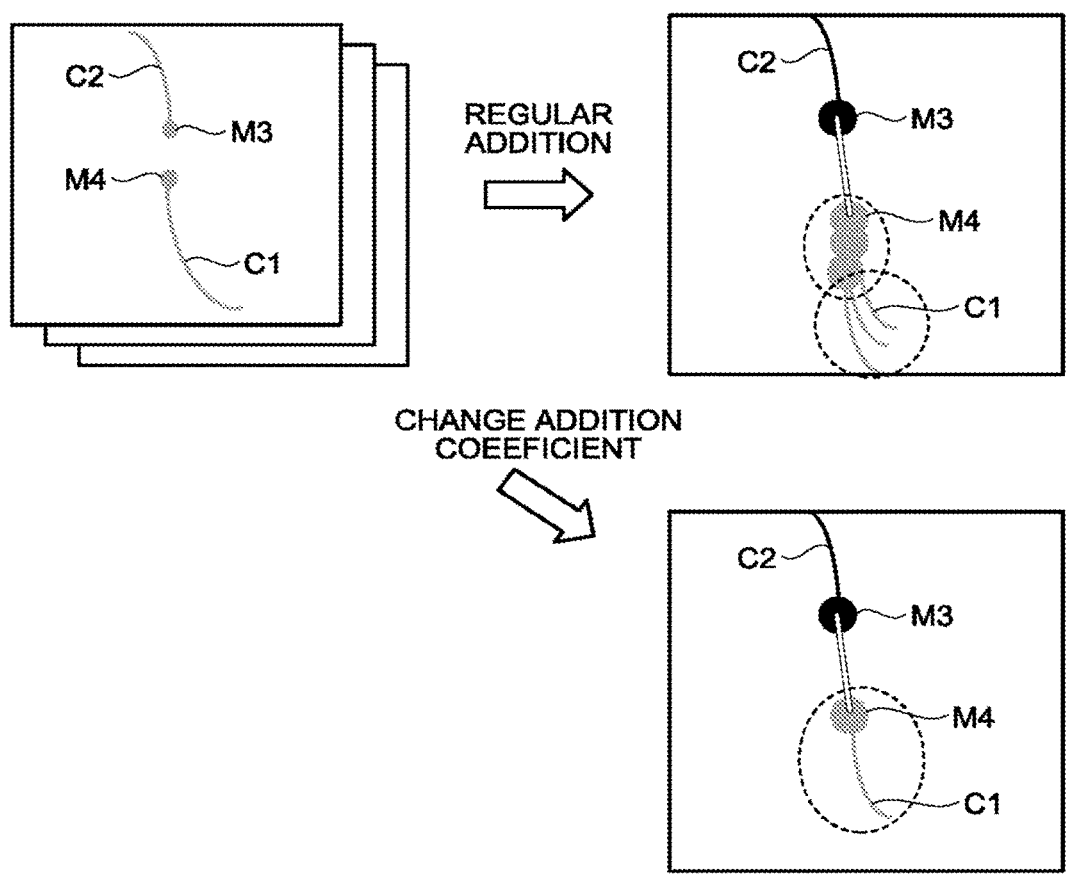
FIG. 14 is a diagram that illustrates an example of the determination process by the determining function according to a second embodiment.

With reference to FIG. 14, an explanation is given below of a determination process by the determining function 213 according to the second embodiment. FIG. 14 is a diagram that illustrates an example of the determination process by the determining function 213 according to the second embodiment. Furthermore, FIG. 14 illustrates the case where image deforming process is conducted to match the position of the single point based on two markers in each corrected image and the slope of the line segment that connects the two markers and the display image is generated by adding multiple corrected images.

FIG. 14 illustrates an example of the case where the catheter C2 is placed within the blood vessel and the catheter C1 is further moved upward. In such a case, the detecting function 211 first detects the positions of the marker M3 and the marker M4 included in each frame. Then, the corrected image generating function 212 determines the single point based on the marker M3 and the marker M4 (e.g., the middle point between the marker M3 and the marker M4), detected from each frame by the detecting function 211, and the slope of the line segment that connects the marker M3 and the marker M4, performs an image deforming process to match the position of the determined point and the slope, and sequentially generates a corrected image. The determining function 213 measures changes in the distance between the middle point and the marker M3 in a sequentially generated corrected image or the distance between the middle point and the marker M4.

Here, if a change in the distance exceeds a predetermined threshold, the determining function 213 changes the addition coefficient such that the amount of previous frames to be added is reduced with regard to the entire corrected image. For example, the determining function 213 decreases the number of previous frames to be added or decreases the weight in the recursive filter. In the case of FIG. 14, as the catheter C1 is further moved upward, the marker M4, attached to the catheter C1, is moved. Therefore, if the addition process of the recursive filter, or the like, is performed on the entire image as usual, the catheter C1 and the marker M4, which are located in different positions in corrected images, are drawn on a display image and they are observed like residual images, as illustrated in the dotted-line ellipse in the upper section on the right side of FIG. 14.

Therefore, the determining function 213 measures changes in the distance between the middle point and the marker and changes the addition coefficient in accordance with a measurement result. For example, the determining function 213 measures changes in the distance from the middle point between the marker M3 and the marker M4 to each of the markers in sequentially generated corrected images and, if a change in the distance in accordance with a movement of the catheter C1 exceeds the threshold, changes the addition coefficient of the entire image. For example, with respect to the entire image, the determining function 213 makes changes, such as conducting no addition process, or decreasing the number of frames to be added. Thus, as illustrated in the dotted-line ellipse in the lower section on the right side of FIG. 14, the catheter C1 and the marker M4, which are located at different positions in corrected images, are not drawn on the display image, and only the catheter C1 and the marker M4 are observed in the current frame.

Next, with reference to FIG. 15, an explanation is given of a process of the X-ray diagnosis apparatus 100 according to the second embodiment. FIG. 15 is a flowchart that illustrates the steps of the process of the X-ray diagnosis apparatus 100 according to the second embodiment. Step S201 illustrated in FIG. 15 is the step that is executed when the processing circuitry 21 reads the program that corresponds to the control function from the storage circuitry 25. Furthermore, Step S202 is the step that is executed when the processing circuitry 21 reads the program that corresponds to the detecting function 211 from the storage circuitry 25. Furthermore, Step S203 is the step that is executed when the processing circuitry 21 reads the program that corresponds to the corrected image generating function 212 from the storage circuitry 25. Furthermore, Steps S204 and S207 are the steps that are executed when the processing circuitry 21 reads the program that corresponds to the display controlling function 214 from the storage circuitry 25. Moreover, Steps S205 and S206 are the steps that are executed when the processing circuitry 21 reads the program that corresponds to the determining function 213 from the storage circuitry 25.

At Step S201, the processing circuitry 21 collects X-ray images. At Step S202, the processing circuitry 21 detects the marker from each of the collected X-ray images. At Step S203, the processing circuitry 21 conducts image deforming process on the X-ray image on the basis of the position of the marker, thereby generating a corrected image. At Step S204, the processing circuitry 21 adds corrected images with the predetermined addition coefficient and displays them.

At Step S205, the processing circuitry 21 determines whether a change in the distance exceeds the predetermined threshold. Here, if a change in the distance exceeds the predetermined threshold (Yes at Step S205), the processing circuitry 21 changes the addition coefficient of the entire image at Step S206. Furthermore, if a change in the distance does not exceed the predetermined threshold (No at Step S205), the processing circuitry 21 continuously presents the display image that undergoes addition with the predetermined addition coefficient. If the addition coefficient is changed at Step S206, the processing circuitry 21 presents the display image, to which a corrected image is added with the changed addition coefficient at Step S207.

As described above, according to the second embodiment, the detecting function 211 detects the position of the object included in each of the sequentially generated X-ray images. The corrected image generating function 212 uses the position of the object, which is detected from the reference image included in the X-ray images, as the reference position and sequentially generates a corrected image that undergoes a correction process to match the position of the object, detected in a newly generated X-ray image, with the reference position. The determining function 213 determines the addition coefficient of the corrected image, sequentially generated by the corrected image generating function 212, in accordance with a change in the distance that is calculated on the basis of the position of the object. The display controlling function 214 causes the display 23 to present the added image, to which a corrected image is added on the basis of the addition coefficient that is determined by the determining function 213. Therefore, the X-ray diagnosis apparatus 100 according to the second embodiment is capable of improving the visibility upon display of moving images even if the object for virtually stopping the device is moved.

Furthermore, according to the second embodiment, the determining function 213 calculates the distance from the middle point between the objects to the predetermined position, detected from a single X-ray image among X-ray images that are sequentially generated by the corrected image generating function 212 and, if a change in the calculated distance exceeds the predetermined threshold, determines the addition coefficient such that the amount of corrected images to added is reduced. Therefore, the X-ray diagnosis apparatus 100 according to the second embodiment may detect movements of the object for virtually stopping the device and may change the display image.

Furthermore, according to the second embodiment, the determining function 213 calculates the distance from the middle point to the object. Therefore, the X-ray diagnosis apparatus 100 according to the second embodiment makes it possible to easily detect movements of the object for virtually stopping the device.

Third Embodiment

Although an explanation is given above of the first embodiment and the second embodiment, various different embodiments may be implemented other than the above-described first and second embodiments.

In the above-described first embodiment, an explanation is given of a case where the addition coefficients of the two regions in corrected image are changed. However, the number of regions may be optionally set, and there may be a case where, for example, the addition coefficients of three or more regions are changed. In this case, for example, there may be a case where the addition coefficient is changed in accordance with the amount of change in the pixel value of each region.

In the above-described first and second embodiments, an explanation is given of a case where the display image, which undergoes the addition process with the default addition coefficient, is turned into the display image with the changed addition coefficient. However, this is not a limitation on the embodiment, and there may be a case where the display image is switched in accordance with, for example, the state of change in the pixel value or the state of change in the distance. For example, there may be a case where after the display image, which undergoes the addition process with the default addition coefficient, is turned into the display image with the changed addition coefficient, changes in the pixel value or changes in the distance are continuously measured and, if changes in the pixel value or changes in the distance are lower than the predetermined threshold, the display image with the changed addition coefficient is switched to the display image that undergoes the addition process with the default addition coefficient so as to be displayed.

Furthermore, in the above-described embodiment, an explanation is given of an example of the case where frequency images are generated as enhanced images. However, this is not a limitation on the embodiment, and there may be a case where images that have a predetermined brightness value are generated as enhanced images. In such a case, the detecting function 211 generates, as enhanced images, images where the brightness value other than the brightness value that indicates the object (e.g., the stent marker) is replaced with a predetermined brightness value (e.g., the brightness value "0"). Thus, the detecting function 211 may generate enhanced images where the object is enhanced.

Furthermore, in the above-described embodiment, an explanation is given of a case where the X-ray diagnosis apparatus 100 performs each process. However, this is not a limitation on the embodiment, and there may be a case where an image processing apparatus performs each of the above-described processes. In such a case, for example, the image processing apparatus acquires X-ray images via a network and performs each of the above-described processes on acquired X-ray images. That is, the image processing apparatus includes the processing circuitry that performs the same function as the above-described processing circuitry 21. Furthermore, the processing circuitry in the image processing apparatus performs the detecting function 211, the corrected image generating function 212, the determining function 213, and the display controlling function 214, described above, on acquired X-ray images.

Furthermore, the components of each device illustrated in the first embodiment are functionally conceptual and do not necessarily need to be physically configured as illustrated in the drawings. Specifically, specific forms of separation and combination of each device are not limited to those depicted in the drawings, and a configuration may be such that all or some of them are functionally or physically separated or combined in an arbitrary unit depending on various types of loads or usage. All or any of various processing functions performed by each device may be implemented by a CPU and a program that is analyzed and executed by the CPU or may be implemented by wired logic hardware.

Furthermore, the display method, described in the above embodiment, may be implemented when prepared control programs are executed by a computer, such as a personal computer or a workstation. The controlling program may be distributed via a network, such as the Internet. Furthermore, the control program may be recorded in a recording medium readable by computers, such as hard disk, flexible disk (FD), CD-ROM, MO, or DVD, and executed by being read from the recording medium by the computer.

As described above, according to at least one of the embodiments, image visibility may be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising processing circuitry configured to
    detect a position of an object included in each of sequentially generated X-ray images;
    generate corrected images sequentially by a correction process to substantially match, with a reference position, the detected position of the object in a X-ray image generated after a reference X-ray image, the reference position being the detected position in the reference X-ray image;
    determine an addition condition of each region of one of the sequentially generated corrected images, the addition condition including at least one of a weighting coefficient with regard to addition of the one of the sequentially generated corrected images and a number of the corrected images to be added; and
    cause a display to display an added image to which the one of the sequentially generated corrected images is added in accordance with the determined addition condition.

2. The image processing apparatus according to claim 1, wherein the processing circuitry is configured to determine the addition condition in accordance with a change in a pixel value of the one of the sequentially generated corrected images.

3. The image processing apparatus according to claim 2, wherein the processing circuitry is configured to determine, when the change in the pixel value of the one of the sequentially generated corrected images exceeds a predetermined threshold, the addition condition such that an amount of the corrected images to be added is reduced.

4. The image processing apparatus according to claim 1, wherein the processing circuitry is configured to determine an addition condition of a first region, which is between objects in the one of the sequentially generated corrected images, and an addition condition of a region that is different from the first region in the one of the sequentially generated corrected images.

5. The image processing apparatus according to claim 1, wherein the processing circuitry is further configured to
    receive an operation to designate a region in the one of the sequentially generated corrected images; and
    determine an addition condition of the received region in the one of the sequentially generated corrected images.

6. The image processing apparatus according to claim 1, wherein the processing circuitry is further configured to
    receive an input operation to display the added image on the display; and
    cause the display to display the added image, when the input operation is received.

7. An image processing apparatus comprising processing circuitry configured to
    detect a position of an object included in each of sequentially generated X-ray images;
    generate corrected images sequentially by a correction process to substantially match, with a reference position, the detected position of the object in a X-ray image generated after a reference X-ray image, the reference position being the detected position in the reference X-ray image;
    determine an addition condition of one of sequentially generated corrected images in accordance with a change in a distance that is calculated based on the position of the object, and
    cause a display to display an added image to which the one of sequentially generated corrected images is added in accordance with the determined addition condition.

8. The image processing apparatus according to claim 7, wherein the addition condition includes at least one of a weighting coefficient with regard to addition of the corrected image and a number of the corrected images to be added.

9. The image processing apparatus according to claim 7, wherein the processing circuitry is configured to
    calculate a distance from a middle point between two objects to a predetermined position, detected from a single X-ray image among the sequentially generated X-ray images, and
    determine, when the change in the calculated distance exceeds a predetermined threshold, the addition condition such that a number of the corrected images to be added is reduced.

10. The image processing apparatus according to claim 9, wherein the processing circuitry is configured to calculate a distance from the middle point to one of the two objects.

11. The image processing apparatus according to claim 7, wherein the processing circuitry is further configured to:
    receive an input operation to display the added image on the display; and
    cause the display to display the added image, when the input operation is received.

12. An X-ray diagnosis apparatus comprising processing circuitry configured to
    sequentially generate X-ray images based on an X-ray that is emitted from an X-ray tube and is transmitted through a subject;
    detect a position of an object included in each of sequentially generated X-ray images;
    generate corrected images sequentially by a correction process to substantially match, with a reference position, the detected position of the object in a X-ray image generated after a reference X-ray image, the reference position being the detected position in the reference X-ray image;
    determine an addition condition of each region of one of the sequentially generated corrected images, the addition condition including at least one of a weighting coefficient with regard to addition of the one of the sequentially generated corrected images and a number of the corrected images to be added; and cause a display to display an added image to which the one of the sequentially generated corrected images is added in accordance with the determined addition condition.

13. The X-ray diagnosis apparatus according to claim 12, wherein the processing circuitry is configured to determine an addition condition of a first region, which is between objects in the one of the sequentially generated corrected images, and an addition condition of a region different from the first region in the one of the sequentially generated corrected images.

14. The X-ray diagnosis apparatus according to claim 12, wherein the processing circuitry is configured to determine the addition condition in accordance with a change in a pixel value of the one of the sequentially generated corrected images.

15. An X-ray diagnosis apparatus comprising a processing circuitry configured to sequentially generate X-ray images based on an X-ray that is emitted from an X-ray tube and is transmitted through a subject;

detect a position of an object included in each of sequentially generated X-ray images;

generate corrected images sequentially by a correction process to substantially match, with a reference position, the detected position of the object in a X-ray image generated after a reference X-ray image, the reference position being the detected position in the reference X-ray image;

determine an addition condition of one of the sequentially generated corrected images in accordance with a change in a distance that is calculated based on the position of the object; and cause a display to display an added image to which the one of the sequentially generated corrected images is added in accordance with the determined addition condition.

16. The X-ray diagnosis apparatus according to claim 15, wherein the processing circuitry is configured to calculate a distance from a middle point between two objects to a predetermined position, detected from a single X-ray image among sequentially generated X-ray images, and determine, when the change in the calculated distance exceeds a predetermined threshold, the addition condition such that a number of the corrected images to be added is reduced.

17. The X-ray diagnosis apparatus according to claim 16, wherein the processing circuitry is configured to calculate a distance from the middle point to one of the two objects.

18. The X-ray diagnosis apparatus according to claim 16, wherein the addition condition includes at least one of a weighting coefficient with regard to addition of the corrected image and a number of the corrected images to be added.

* * * * *